United States Patent
Akkarakaran et al.

(10) Patent No.: US 10,462,755 B2
(45) Date of Patent: Oct. 29, 2019

(54) TECHNIQUES AND APPARATUSES FOR POWER HEADROOM REPORTING IN NEW RADIO

(71) Applicant: QUALCOMM Incorporated, San Diego, CA (US)

(72) Inventors: Sony Akkarakaran, Poway, CA (US); Wanshi Chen, San Diego, CA (US); Valentin Alexandru Gheorghiu, Tokyo (JP); Juan Montojo, San Diego, CA (US); Yi Huang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/007,589

(22) Filed: Jun. 13, 2018

(65) Prior Publication Data
US 2018/0368081 A1 Dec. 20, 2018

Related U.S. Application Data

(60) Provisional application No. 62/521,101, filed on Jun. 16, 2017.

(51) Int. Cl.
*H04W 52/36* (2009.01)
*H04W 52/32* (2009.01)
(Continued)

(52) U.S. Cl.
CPC ....... *H04W 52/365* (2013.01); *H04W 52/146* (2013.01); *H04W 52/242* (2013.01);
(Continued)

(58) Field of Classification Search
CPC ............. H04W 52/146; H04W 52/242; H04W 52/325; H04W 52/365; H04W 52/367; H04W 52/42
(Continued)

(56) References Cited

U.S. PATENT DOCUMENTS 9,419,766 B2 * 8/2016 Takeda .................. H04L 5/0053
9,426,755 B2 * 8/2016 Hoshino ............... H04W 52/18
(Continued)

FOREIGN PATENT DOCUMENTS

EP        3038281 A1    6/2016
WO     2010151196 A1   12/2010
(Continued)

OTHER PUBLICATIONS

NTT Docomo, Inc., "Status Report of WI on New Radio (NR) Access Technology", RP-171505, 3GPP TSG RAN meeting #76, West Palm Beach, USA, Jun. 5-8, 2017, 218 pages.
(Continued)

*Primary Examiner* — Tan H Trinh
(74) *Attorney, Agent, or Firm* — Harrity & Harrity LLP/Qualcomm Incorporated

(57) ABSTRACT

Certain aspects of the present disclosure generally relate to wireless communication. In some aspects, a user equipment may determine one or more power parameters that contribute to a transmit power level for a sounding reference signal (SRS), wherein the one or more power parameters are configured differently for different types of SRS transmissions; determine the transmit power level for the SRS based at least in part on the one or more power parameters; and transmit the SRS using the transmit power level. Numerous other aspects are provided.

32 Claims, 13 Drawing Sheets

(51) Int. Cl.
*H04W 52/42* (2009.01)
*H04W 52/24* (2009.01)
*H04W 52/14* (2009.01)

(52) U.S. Cl.
CPC ......... *H04W 52/325* (2013.01); *H04W 52/42* (2013.01); *H04W 52/367* (2013.01)

(58) Field of Classification Search
USPC ....... 455/69, 522, 67.16, 509; 370/311, 315, 370/345, 329
See application file for complete search history.

(56) References Cited

U.S. PATENT DOCUMENTS

| | | | |
|---|---|---|---|
| 9,544,855 B2 | 1/2017 | Jeong et al. | |
| 2010/0246561 A1* | 9/2010 | Shin | H04W 52/32 370/345 |
| 2011/0294529 A1* | 12/2011 | Luo | H04L 5/0035 455/509 |
| 2013/0078913 A1* | 3/2013 | Lee | H04L 5/0007 455/39 |
| 2013/0242895 A1 | 9/2013 | Chen et al. | |
| 2013/0250847 A1* | 9/2013 | Lee | H04L 5/0051 370/315 |
| 2013/0272230 A1* | 10/2013 | Dinan | H04W 52/18 370/329 |
| 2014/0016576 A1* | 1/2014 | Noh | H04W 52/362 370/329 |
| 2014/0112260 A1* | 4/2014 | Sorrentino | H04W 52/325 370/329 |
| 2014/0213315 A1* | 7/2014 | Kim | H04W 52/325 455/522 |
| 2014/0219234 A1* | 8/2014 | Kim | H04W 52/365 370/329 |
| 2014/0226578 A1* | 8/2014 | Zhu | H04W 52/146 370/329 |
| 2014/0321406 A1* | 10/2014 | Marinier | H04B 7/024 370/329 |
| 2015/0085787 A1* | 3/2015 | Ouchi | H04L 5/0037 370/329 |
| 2015/0124673 A1* | 5/2015 | Ouchi | H04W 52/146 370/311 |
| 2016/0014701 A1* | 1/2016 | Nam | H04L 5/0005 370/329 |
| 2016/0094481 A1 | 3/2016 | Xu et al. | |
| 2016/0227491 A1* | 8/2016 | Park | H04W 52/325 |
| 2017/0141894 A1* | 5/2017 | Wei | H04B 17/309 |
| 2017/0195998 A1 | 7/2017 | Zhang et al. | |
| 2018/0049137 A1* | 2/2018 | Li | H04B 17/309 |
| 2018/0115957 A1 | 4/2018 | Lin et al. | |
| 2018/0198582 A1* | 7/2018 | Andersson | H04L 5/0007 |
| 2018/0324716 A1* | 11/2018 | Jeon | H04W 52/50 |
| 2018/0324770 A1* | 11/2018 | Nogami | H04L 5/0053 |
| 2018/0324853 A1* | 11/2018 | Jeon | H04W 74/08 |
| 2018/0332541 A1* | 11/2018 | Liu | H04W 52/146 |
| 2018/0368075 A1* | 12/2018 | Chen | H04W 52/146 |
| 2018/0368142 A1* | 12/2018 | Liou | H04W 72/0446 |
| 2019/0053166 A1* | 2/2019 | Nagaraja | H04W 76/27 |
| 2019/0110257 A1* | 4/2019 | Iwai | H04W 52/16 |
| 2019/0141639 A1* | 5/2019 | Rahman | H04W 52/22 |

FOREIGN PATENT DOCUMENTS

| | | | | |
|---|---|---|---|---|
| WO | WO-2010151196 A1 * | 12/2010 | ......... | H04W 52/146 |
| WO | 2011155711 A2 | 12/2011 | | |

OTHER PUBLICATIONS

Samsung: "PHR Format for Beam Specific Power Control", 3GPP Draft; R2-1703357, 3rd Generation Partnership Project (3GPP), 3GPP TSG-RAN WG2 Meeting #97bis, Spokane, US, vol. RAN WG2, Apr. 3, 2017 (Apr. 3, 2017), pp. 1-3.

GATT: "SRS Power Control in Multi-Beam Configuration", 3GPP Draft, R1-1707531, SRS Power Control Multi-Beam, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), XP051272739, pp. 1-6, Retrieved from the Internet: URL:http://www.3gpp.org/ftp/Meetings 3GPP SYNC/RAN1/Docs/ [retrieved on May 14, 2017].

Nokia et al., "UL Power Control for MIMO", 3GPP Draft, R1-1705978, 3rd Generation Partnership Project (3GPP), Mobile Competence Centre , 650, Route Des Lucioles, F-06921 Sophia-Antipolis Cedex, France, vol. RAN WG1, No. Spokane, WA, USA, Apr. 3, 2017-Apr. 7, 2017, Mar. 24, 2017 (Mar. 24, 2017), XP051250800, 6 Pages, Retrieved from the Internet: URL:http://www.3gpp.org/ftp/tsg_ran/WG1_RL1/TSGR1_88b/Docs/ [retrieved on Mar. 24, 2017].

Partial International Search Report—PCT/US2018/037558—ISA/EPO—dated Aug. 31, 2018.

International Search Report and Written Opinion—PCT/US2018/037558—ISA/EPO—dated Nov. 20, 2018.

* cited by examiner

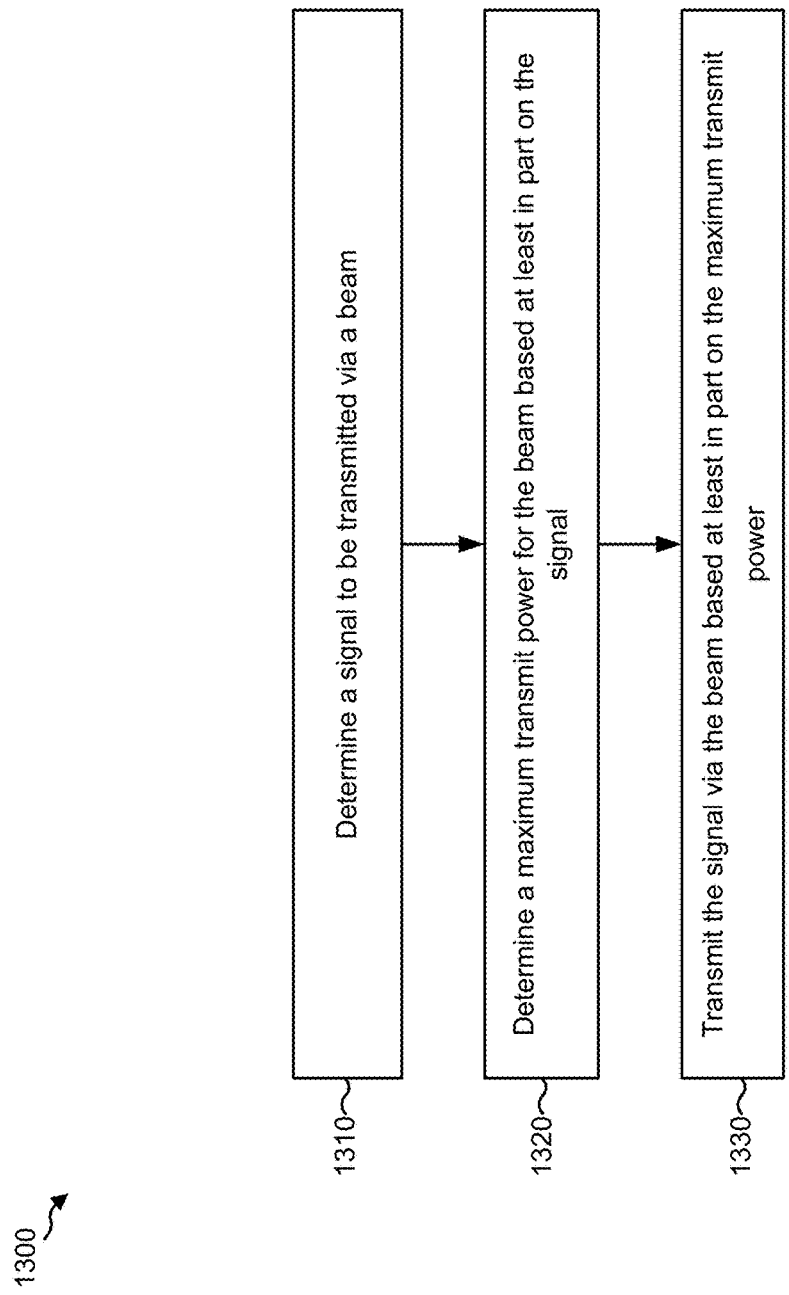

TECHNIQUES AND APPARATUSES FOR POWER HEADROOM REPORTING IN NEW RADIO

CROSS-REFERENCE TO RELATED APPLICATIONS UNDER 35 U.S.C. § 119

This application claims priority to U.S. Provisional Patent Application No. 62/521,101, filed on Jun. 16, 2017, entitled "TECHNIQUES AND APPARATUSES FOR POWER HEADROOM REPORTING IN NEW RADIO," which is hereby expressly incorporated by reference herein.

FIELD OF THE DISCLOSURE

Aspects of the present disclosure generally relate to wireless communication, and more particularly to techniques and apparatuses for power headroom reporting in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining, by a user equipment (UE), a plurality of signals to be frequency division multiplexed in an uplink transmission; determining, by the UE, a maximum transmit power based at least in part on the plurality of signals, wherein different signals correspond to different maximum transmit powers; and transmitting, by the UE, a power headroom report that indicates a power headroom value determined based at least in part on the maximum transmit power.

In some aspects, a method of wireless communication may include determining, by a UE, one or more signals, of a plurality of signals, to be transmitted in an uplink transmission; determining, by the UE, a maximum transmit power based at least in part on the one or more signals, wherein different signals of the plurality of signals correspond to different maximum transmit powers; and transmitting, by the UE, a power headroom report that indicates a power headroom value determined based at least in part on the maximum transmit power.

In some aspects, a method of wireless communication may include generating, by a UE, a power headroom report; and transmitting, by the UE, the power headroom report on at least one of: an uplink control channel, as part of uplink control information transmitted on an uplink data channel, or as part of a media access control (MAC) header that is included with a null data packet and transmitted on the uplink data channel.

In some aspects, a method of wireless communication may include determining, by a UE, one or more power parameters that contribute to a transmit power level for a sounding reference signal (SRS), wherein the one or more power parameters are configured differently for different types of SRS transmissions; determining, by the UE, the transmit power level for the SRS based at least in part on the one or more power parameters; and transmitting, by the UE, the SRS using the transmit power level.

In some aspects, a UE for wireless communication may include a memory and one or more processors operatively coupled to the memory. The one or more processors may be configured to determine a plurality of signals to be frequency division multiplexed in an uplink transmission; determine a maximum transmit power based at least in part on the plurality of signals, wherein different signals correspond to different maximum transmit powers; and transmit a power headroom report that indicates a power headroom value determined based at least in part on the maximum transmit power.

In some aspects, a UE for wireless communication may include a memory and one or more processors operatively coupled to the memory. The one or more processors may be configured to determine one or more signals, of a plurality of signals, to be transmitted in an uplink transmission; determine a maximum transmit power based at least in part on the one or more signals, wherein different signals of the plurality of signals correspond to different maximum transmit powers; and transmit a power headroom report that indicates a power headroom value determined based at least in part on the maximum transmit power.

In some aspects, a UE for wireless communication may include a memory and one or more processors operatively coupled to the memory. The one or more processors may be configured to generate a power headroom report; and transmit the power headroom report on at least one of: an uplink control channel, as part of uplink control information transmitted on an uplink data channel, or as part of a MAC header that is included with a null data packet and transmitted on the uplink data channel.

In some aspects, a UE for wireless communication may include a memory and one or more processors operatively coupled to the memory. The one or more processors may be configured to determine one or more power parameters that contribute to a transmit power level for an SRS, wherein the one or more power parameters are configured differently for different types of SRS transmissions; determine the transmit power level for the SRS based at least in part on the one or more power parameters; transmit the SRS using the transmit power level.

In some aspects, an apparatus for wireless communication may include means for determining a plurality of signals to be frequency division multiplexed in an uplink transmission; means for determining a maximum transmit power based at least in part on the plurality of signals, wherein different signals correspond to different maximum transmit powers; and means for transmitting a power headroom report that indicates a power headroom value determined based at least in part on the maximum transmit power.

In some aspects, an apparatus for wireless communication may include means for determining one or more signals, of a plurality of signals, to be transmitted in an uplink transmission; means for determining a maximum transmit power based at least in part on the one or more signals, wherein different signals of the plurality of signals correspond to different maximum transmit powers; and means for transmitting a power headroom report that indicates a power headroom value determined based at least in part on the maximum transmit power.

In some aspects, an apparatus for wireless communication may include means for generating a power headroom report; and means for transmitting the power headroom report on at least one of: an uplink control channel, as part of uplink control information transmitted on an uplink data channel, or as part of a MAC header that is included with a null data packet and transmitted on the uplink data channel.

In some aspects, an apparatus for wireless communication may include means for determining one or more power parameters that contribute to a transmit power level for an SRS, wherein the one or more power parameters are configured differently for different types of SRS transmissions; means for determining the transmit power level for the SRS based at least in part on the one or more power parameters; and means for transmitting the SRS using the transmit power level.

In some aspects, a non-transitory computer-readable medium may store one or more instructions for wireless communication. The one or more instructions, when executed by one or more processors, may cause the one or more processors to determine a plurality of signals to be frequency division multiplexed in an uplink transmission; determine a maximum transmit power based at least in part on the plurality of signals, wherein different signals correspond to different maximum transmit powers; and transmit a power headroom report that indicates a power headroom value determined based at least in part on the maximum transmit power.

In some aspects, a non-transitory computer-readable medium may store one or more instructions for wireless communication. The one or more instructions, when executed by one or more processors, may cause the one or more processors to determine one or more signals, of a plurality of signals, to be transmitted in an uplink transmission; determine a maximum transmit power based at least in part on the one or more signals, wherein different signals of the plurality of signals correspond to different maximum transmit powers; and transmit a power headroom report that indicates a power headroom value determined based at least in part on the maximum transmit power.

In some aspects, a non-transitory computer-readable medium may store one or more instructions for wireless communication. The one or more instructions, when executed by one or more processors, may cause the one or more processors to generate a power headroom report; and transmit the power headroom report on at least one of: an uplink control channel, as part of uplink control information transmitted on an uplink data channel, or as part of a MAC header that is included with a null data packet and transmitted on the uplink data channel.

In some aspects, a non-transitory computer-readable medium may store one or more instructions for wireless communication. The one or more instructions, when executed by one or more processors, may cause the one or more processors to determine one or more power parameters that contribute to a transmit power level for an SRS, wherein the one or more power parameters are configured differently for different types of SRS transmissions; determine the transmit power level for the SRS based at least in part on the one or more power parameters; transmit the SRS using the transmit power level.

In some aspects, a method of wireless communication, performed by a UE, may include determining a signal to be transmitted via a beam; determining a maximum transmit power for the beam based at least in part on the signal; and transmitting the signal via the beam based at least in part on the maximum transmit power.

In some aspects, a UE for wireless communication may include a memory and one or more processors operatively coupled to the memory. The one or more processors may be configured to determine a signal to be transmitted via a beam; determine a maximum transmit power for the beam based at least in part on the signal; and transmit the signal via the beam based at least in part on the maximum transmit power.

In some aspects, a non-transitory computer-readable medium may store one or more instructions for wireless communication. The one or more instructions, when executed by one or more processors of a UE, may cause the one or more processors to determine a signal to be transmitted via a beam; determine a maximum transmit power for the beam based at least in part on the signal; and transmit the signal via the beam based at least in part on the maximum transmit power.

In some aspects, an apparatus for wireless communication may include means for determining a signal to be transmitted via a beam; means for determining a maximum transmit power for the beam based at least in part on the signal; and means for transmitting the signal via the beam based at least in part on the maximum transmit power.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8-13 are diagrams illustrating example processes performed, for example, by a user equipment, in accordance with various aspects of the present disclosure.

DETAILED DESCRIPTION

Figure 1:
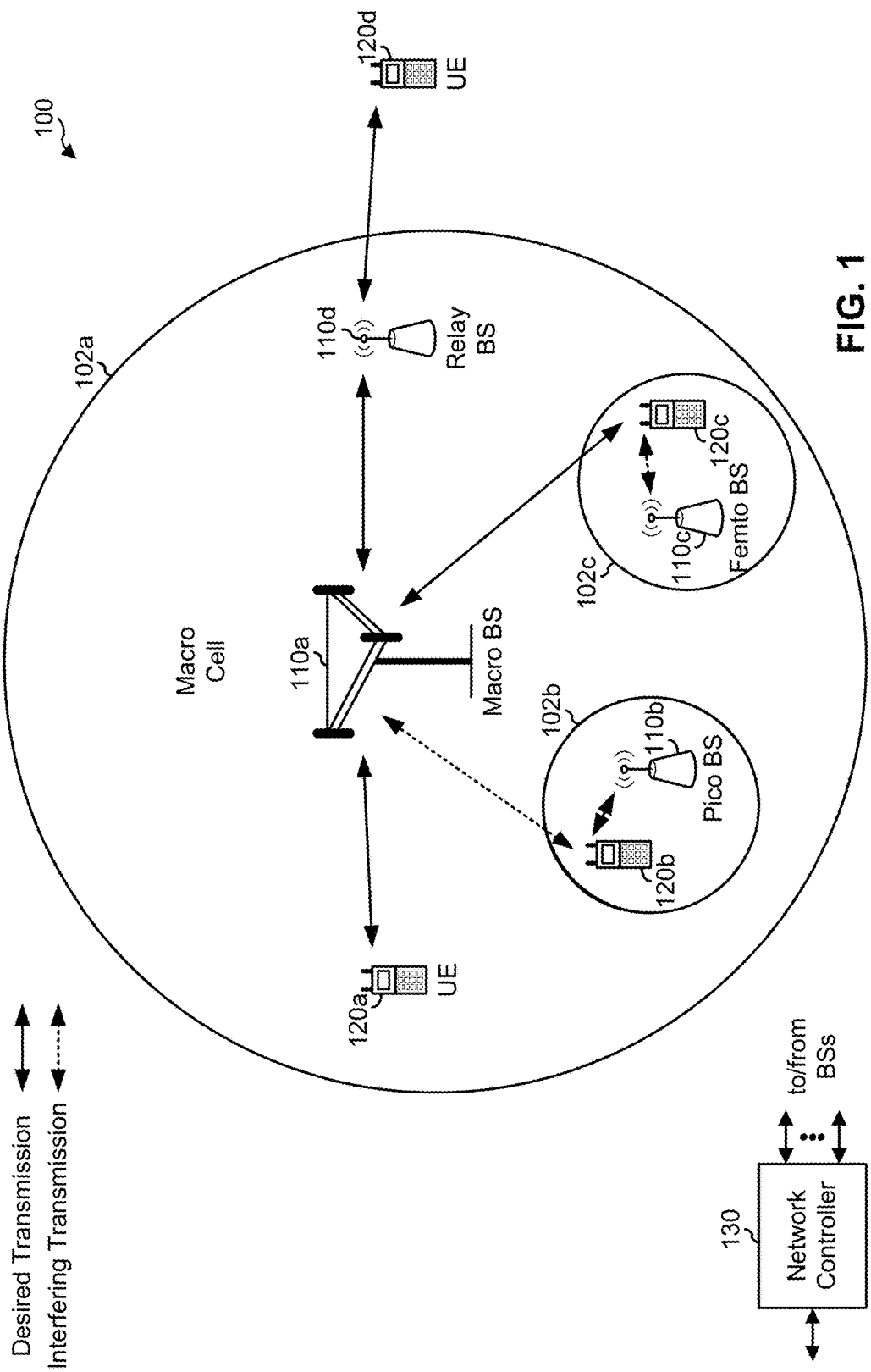
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing 120' that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
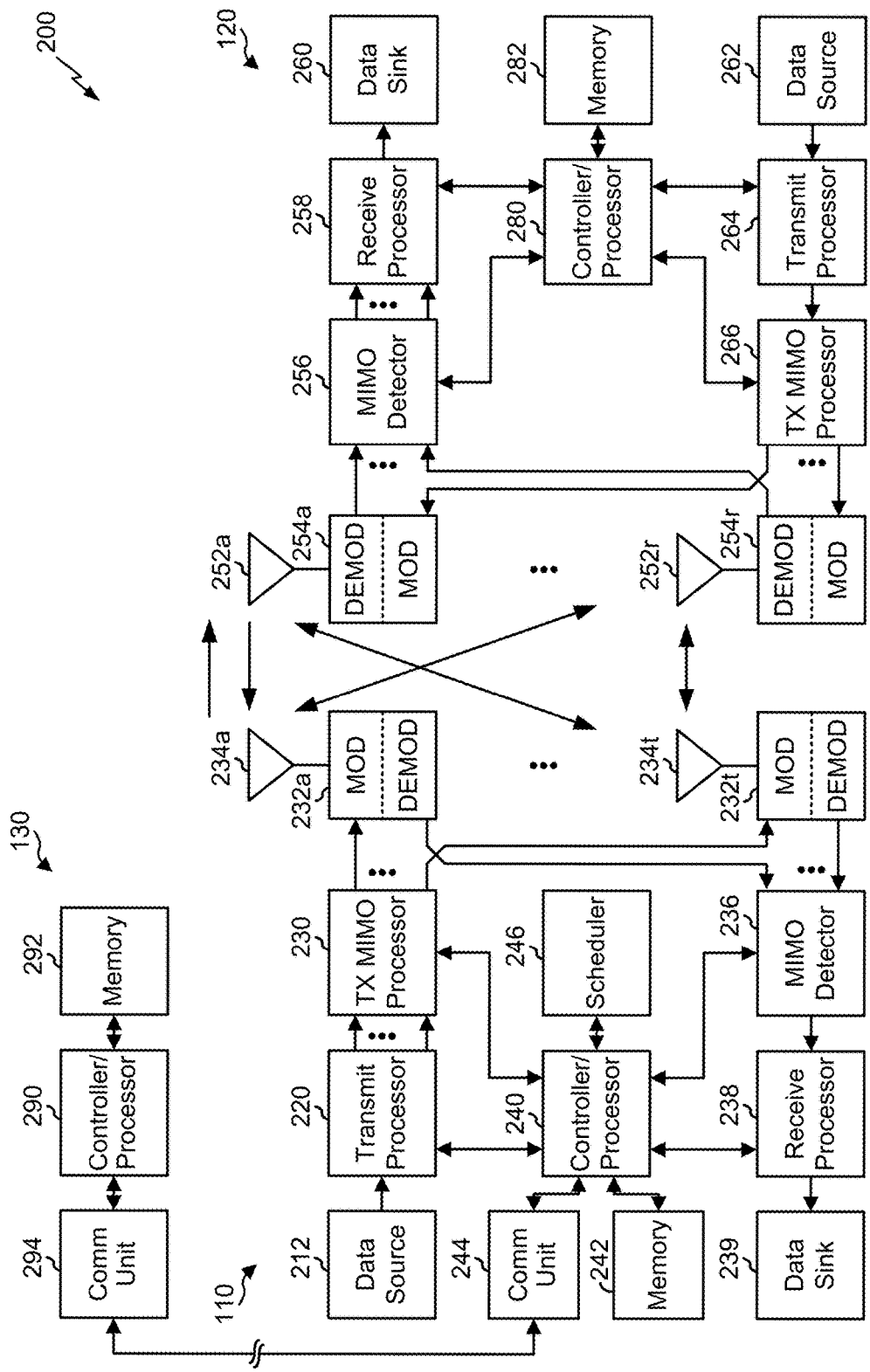
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform power headroom reporting and/or SRS power control in New Radio, as described in more detail elsewhere herein. For example, controller/processor 280 and/or other processors and modules at UE 120, may perform or direct operations of UE 120 to perform power headroom reporting and/or SRS power control in New Radio. For example, controller/processor 280 and/or other controllers/processors and modules at UE 120 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. In some aspects, one or more of the components shown in FIG. 2 may be employed to perform example process 800, example process 900, example process 1000, example process 1100, example process 1200, example process 1300, and/or other processes for the techniques described herein. Memories 242 and 282 may store data and program codes for base station 110 and UE 120, respectively. A scheduler 246 may schedule UEs for data transmission on the downlink and/or uplink.

In some aspects, UE 120 may include means for determining a plurality of signals to be frequency division multiplexed in an uplink transmission, means for determining a maximum transmit power based at least in part on the plurality of signals, means for transmitting a power headroom report that indicates a power headroom value determined based at least in part on the maximum transmit power, and/or means for performing other operations described herein. Such means may include one or more components shown in FIG. 2.

Additionally, or alternatively, UE 120 may include means for determining one or more signals, of a plurality of signals, to be transmitted in an uplink transmission, means for determining a maximum transmit power based at least in part on the one or more signals, means for transmitting a power headroom report that indicates a power headroom value determined based at least in part on the maximum transmit power, and/or means for performing other operations described herein. Such means may include one or more components shown in FIG. 2.

Additionally, or alternatively, UE 120 may include means for generating a power headroom report, means for transmitting the power headroom report on an uplink control channel or as part of uplink control information transmitted on an uplink data channel, and/or means for performing other operations described herein. Such means may include one or more components shown in FIG. 2.

Additionally, or alternatively, UE 120 may include means determining one or more power parameters that contribute to a transmit power level for an SRS, means for determining the transmit power level for the SRS based at least in part on the one or more power parameters, means for transmitting the SRS using the transmit power level, and/or means for performing other operations described herein. Such means may include one or more components shown in FIG. 2.

Additionally, or alternatively, UE 120 may include means for determining a signal to be transmitted via a beam; means for determining a maximum transmit power for the beam based at least in part on the signal; means for transmitting the signal via the beam based at least in part on the maximum transmit power; and/or the like. Such means may include one or more components shown in FIG. 2.

As indicated above, FIG. 2 is provided merely as an example. Other examples are possible and may differ from what was described with regard to FIG. 2.

Figure 3:
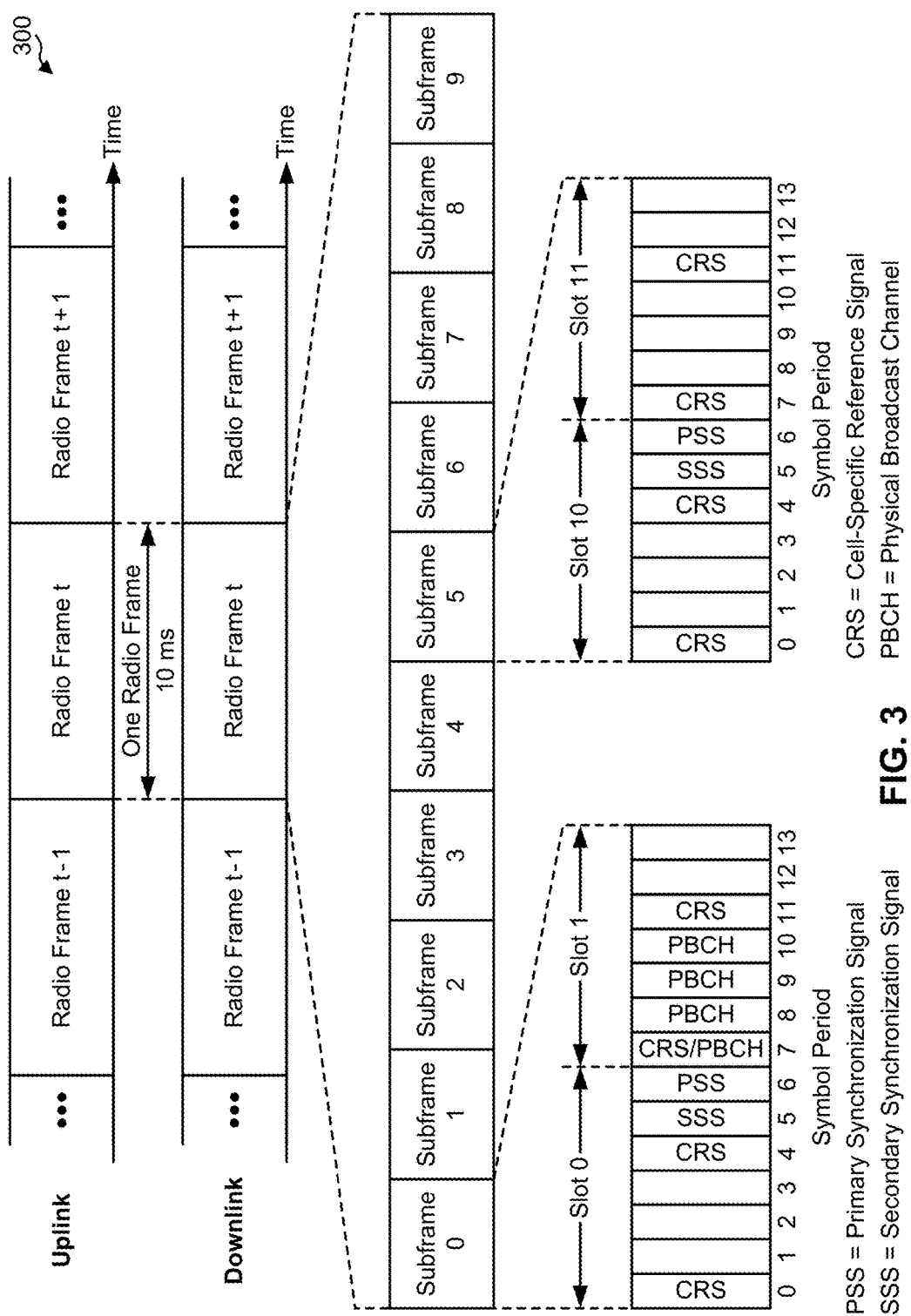
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
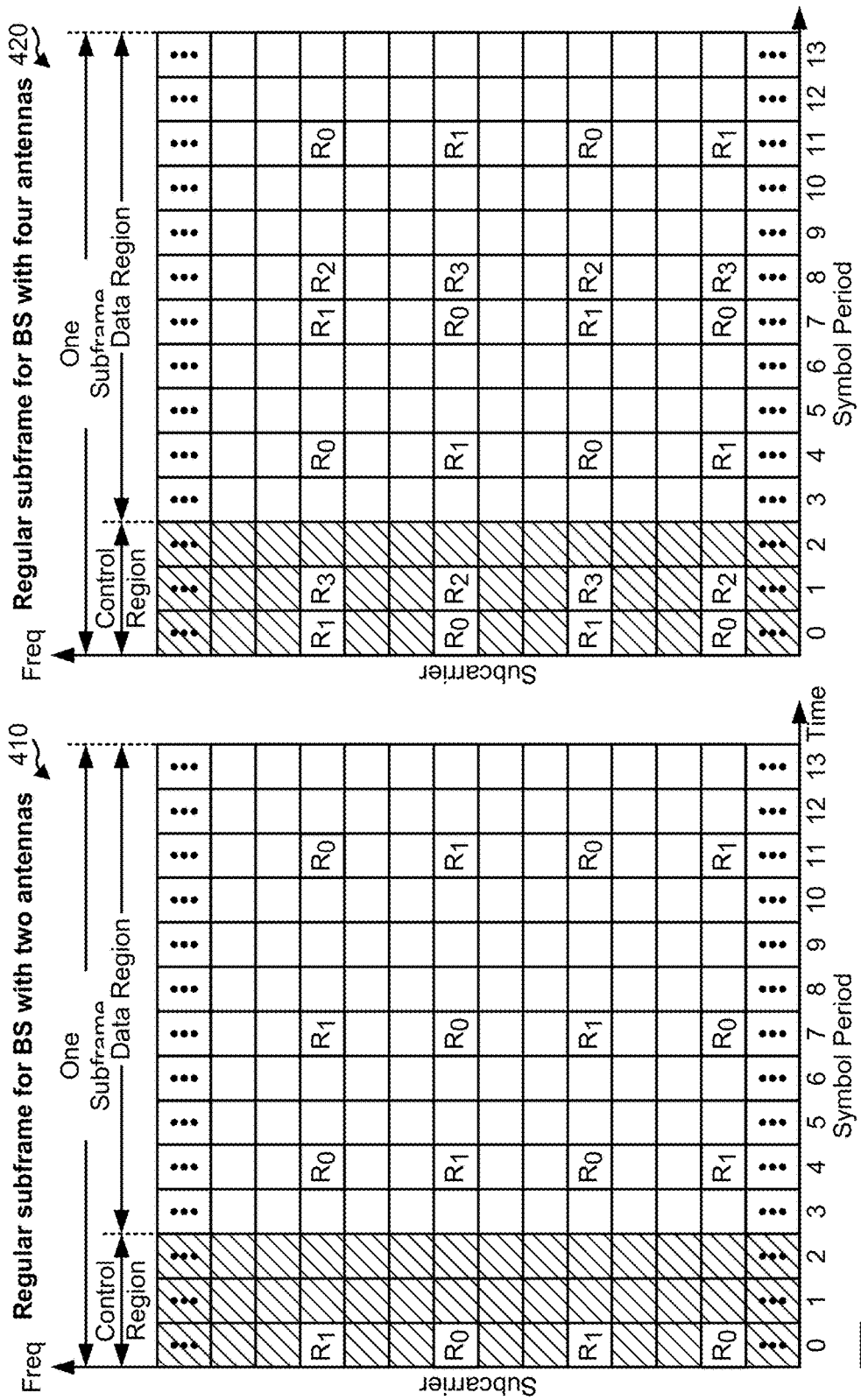
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some case cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Various changes to communications using a New Radio (NR) radio access technology (RAT) may necessitate changes to UE transmit power control. For example, in a RAT that supports beamforming, such as NR, beam-specific power control may be desirable. Additionally, or alternatively, in a RAT such as NR where control signals and data signals may be transmitted on different beams, different signals may be associated with different power characteristics, such as a maximum transmit power. Techniques described herein assist with controlling and/or reporting transmit power levels in NR or a similar type of RAT for more effective communications and to ensure that power constraints are satisfied. For example, techniques described herein assist with power headroom reporting and SRS power control in NR or a similar type of RAT.

Figure 5:
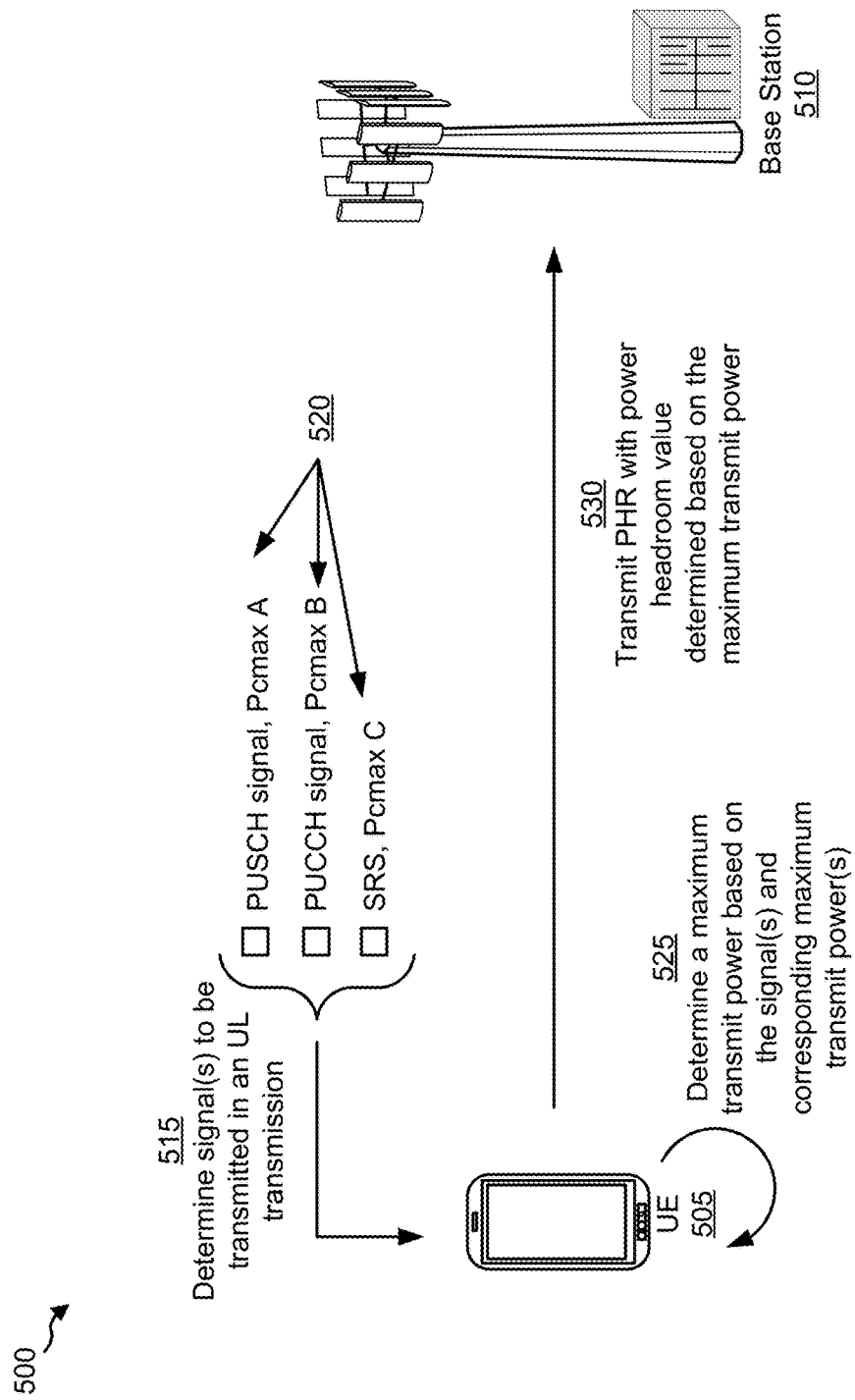
FIG. 5 is a diagram illustrating an example of power headroom reporting in New Radio, in accordance with various aspects of the present disclosure.

FIG. 5 is a diagram illustrating an example 500 of power headroom reporting in New Radio, in accordance with various aspects of the present disclosure.

As shown in FIG. 5, a UE 505 may communicate with a base station 510 to perform power headroom reporting. In some aspects, the UE 505 may correspond to one or more UEs described elsewhere herein, such as UE 120 of FIG. 1 and/or the like. Additionally, or alternatively, the base station 510 may correspond to one or more base stations described elsewhere herein, such as base station 110 of FIG. 1 and/or the like.

As shown by reference number 515, the UE 505 may determine one or more signals, of a plurality of signals, to be transmitted in an uplink transmission. The one or more signals may include, for example, an uplink control channel signal (e.g., a physical uplink control channel (PUCCH) signal, a shortened PUCCH (sPUCCH) signal, and/or the like), an uplink data channel signal (e.g., a physical uplink shared channel (PUSCH) signal, a shortened PUSCH (sPUSCH) signal, an ultra-reliable low latency communication (URLLC) PUCCH, an enhanced mobile broadband (eMBB) PUCCH, and/or the like), a sounding reference signal (SRS), another type of reference signal, and/or the like. In some aspects, the one or more signals include multiple signals (e.g., at least two signals, at least three signals, etc.) to be frequency division multiplexed in the uplink transmission. For example, an uplink control channel signal and an SRS may be frequency division multiplexed; an uplink data channel signal and an SRS may be frequency division multiplexed; an uplink control channel signal and an uplink data channel signal may be frequency division multiplexed; an uplink control channel signal, an uplink data channel signal, and an SRS may be frequency division multiplexed; and/or the like.

As shown by reference number 520, different signals of the plurality of signals may correspond to different maximum transmit powers (e.g., Pcmax or Pcmax values). For example, a PUSCH signal may correspond to a first maximum transmit power, shown as Pcmax A, a PUCCH signal may correspond to a second maximum transmit power, shown as Pcmax B, an SRS may correspond to a third maximum transmit power, shown as Pcmax C, and/or the like. These signals and corresponding maximum transmit powers are shown as examples, and other examples are possible.

As shown by reference number 525, the UE 505 may determine a maximum transmit power, to be used to determine a power headroom value, based at least in part on the one or more signals and the corresponding one or more maximum transmit powers. When different signals correspond to different maximum transmit powers (e.g., Pcmax or Pcmax values), then the UE 505 may determine a particular maximum transmit power to be used to calculate the power headroom value. For example, the power headroom value may be calculated as a difference between a maximum transmit power (e.g., Pcmax or Pcmax) and a transmit power that would have been used without power constraints (e.g., which may be an unconstrained transmit power for a single signal or a sum of unconstrained transmit powers for multiple signals, such as higher priority signals).

In the case where one signal is included in the uplink transmission, then the UE 505 may use the maximum transmit power corresponding to that one signal. However, if multiple signals are frequency division multiplexed in the uplink transmission, then the UE 505 may determine a maximum transmit power based at least in part on the multiple signals. In some aspects, the UE 505 may select a maximum transmit power corresponding to the highest priority signal to be transmitted. For example, if the plurality of signals includes a signal on the uplink control channel (e.g., the PUCCH), then the UE 505 may select the maximum transmit power that corresponds to the uplink control channel. In some aspects, the UE 505 may always use a particular maximum transmit power, associated with a particular signal (e.g., an uplink control channel signal) regardless of whether that signal is being transmitted. In this way, the UE 505 may conserve processing resources by simplifying selection of the maximum transmit power value to be used to determine the power headroom value.

Additionally, or alternatively, the UE 505 may determine the maximum transmit power based at least in part on an indication, associated with the plurality of signals, indicated in a radio resource control (RRC) message. For example, an RRC message (e.g., from the base station 510) may indicate which maximum transmit power to use for different combinations of multiple signals. Additionally, or alternatively, the UE 505 may determine the maximum transmit power based at least in part on a maximum transmit power of a signal that is included in the uplink transmission. Additionally, or alternatively, the UE 505 may determine the maximum transmit power based at least in part on multiple maximum transmit powers corresponding to multiple signals included in the uplink transmission. For example, the UE 505 may average the multiple maximum transmit powers, may select a maximum of the maximum transmit powers, may select a minimum of the maximum transmit powers, and/or the like.

In some aspects, the uplink transmission may be transmitted on a particular beam (e.g., a particular antenna beam), and different beams may be associated with different maximum transmit powers (e.g., Pcmax or Pcmax values). In this case, the UE 505 may determine the maximum transmit power based at least in part on a beam via which the uplink transmission is to be transmitted. Additionally, or alternatively, the UE 505 may determine the maximum transmit power based at least in part on whether the plurality of signals are transmitted on a same beam or different beams. For example, if the plurality of signals are transmitted on different beams, then the UE 505 may use a maximum transmit power corresponding to a particular signal, such as an uplink control signal. In some aspects, the UE 505 may determine the maximum transmit power based at least in part on whether the signals to be included in the uplink transmission are frequency division multiplexed across an entire transmission time of the uplink transmission or a partial transmission time of the uplink transmission. In this way, the maximum transmit power to be used to calculate a power headroom value may be determined in accordance with transmission characteristics, thereby improving performance.

As shown by reference number 530, the UE 505 may transmit a power headroom report (PHR) that indicates a power headroom value determined based at least in part on the maximum transmit power. As described in more detail below in connection with FIG. 6, in some aspects, the UE 505 may transmit the PHR on an uplink control channel. Additionally, or alternatively, the UE 505 may transmit the PHR as part of uplink control information that is included on an uplink data channel (e.g., with or without inclusion of uplink data on the uplink transmission).

In some aspects, the UE 505 may determine to transmit the PHR on the uplink control channel based at least in part on a determination that the uplink control channel is a particular format. Additionally, or alternatively, the UE 505 may determine to transmit the PHR on the uplink control channel based at least in part on a determination that a payload size of the uplink transmission satisfies a condition (e.g., is less than or equal to a threshold). Additionally, or alternatively, the UE 505 may determine to transmit the PHR on the uplink control channel based at least in part on a determination that a resource block allocation for the uplink transmission satisfies a condition. Additionally, or alternatively, the UE 505 may determine to transmit the PHR on the uplink control channel based at least in part on a determination that uplink control information, being carried on the uplink control channel, is of a particular type. In this way, the UE 505 may transmit the PHR on the uplink control channel when conditions are favorable for such a transmission (e.g., uplink control channel traffic is low, there are sufficient RBs to carry the PHR, and/or the like).

In some aspects, a PHR may be triggered when the UE 505 does not have a signal to transmit on the uplink transmission and/or has only a subset of the plurality of signals for transmission. In this case, the UE 505 may use one or more nominal signal configurations, corresponding to one or more signals, to determine the power headroom value. In some aspects, a plurality of different nominal signal configurations may correspond to the plurality of signals. For example, a nominal signal configuration for an uplink control channel signal may include a particular format (e.g., a PUCCH format) and/or the like. Additionally, or alternatively, a nominal signal configuration for an uplink data channel signal may include a particular modulation and coding scheme (MCS), a particular code rate, and/or the like. Additionally, or alternatively, a nominal signal configuration for an SRS may include a particular bandwidth for the SRS, a particular number and/or combination of SRS tones, a particular tone spacing, and/or the like. In some aspects, different combinations of signals may correspond to different nominal signal configurations. In some aspects, a nominal signal configuration may be signaled to the UE 505 in a system information message, an RRC message, in a media access control (MAC) control element, in downlink control information, and/or the like. In this way, the UE 505 may report a power headroom value when the UE 505 does not have information to transmit.

Additionally, or alternatively, when the UE 505 does not have a signal to transmit on the uplink transmission, the UE 505 may use a reference beam (e.g., a default beam) to determine the power headroom value. In some aspects, different reference beams may be used for different signals, and the reference beam may be determined based at least in part on a signal associated with the PHR. In some aspects, the reference beam may be determined as a function of time (e.g., using a slot index). In this way, the UE 505 may transmit PHRs corresponding to all of the different configured beams. Additionally, or alternatively, the reference beam (e.g., a configuration for the reference beam) may be signaled to the UE 505 in an RRC message, in a MAC control element, in downlink control information, and/or the like. In this way, the UE 505 may report a power headroom value when the UE 505 does not have information to transmit.

Additionally, or alternatively, the PHR may be associated with multiple repetitions of the uplink transmission. For example, the uplink transmission may be repeated (e.g., in different slots) to increase reliability. In some cases, the power headroom value may change across different repetitions (e.g., when the UE 505 receives a transmit power command from the base station 510 between repetitions). However, a MAC control element may be maintained (e.g., kept the same) across different repetitions. In this case, if the reported power headroom value associated with the multiple repetitions corresponds only to the first repetition, this may lead to an inaccurate representation of the power headroom across multiple repetitions when there is a difference in uplink transmissions that include the multiple repetitions.

Thus, for more accurate power headroom reporting, the power headroom value may be determined based at least in part on a number of repetitions associated with the uplink transmission. Additionally, or alternatively, the power headroom value may be based at least in part on one or more signals included in the multiple repetitions. For example, if there are many repetitions (e.g., more than a threshold), but only one of the repetitions (e.g., the first) or a few repetitions (e.g., less than a threshold) are frequency division multiplexed with a particular signal (e.g., an SRS), then the UE 505 may exclude values associated with the particular signal when determining the power headroom value. Additionally, or alternatively, if a majority or some threshold number of repetitions include at least two signals (e.g., a PUCCH signal and a PUSCH signal), then the UE 505 may include value associated with those signals when determining the power headroom value. In this way, the UE 505 may more accurately report a power headroom value associated with the multiple repetitions.

In some aspects, the UE 505 may determine the power headroom value based at least in part on a beam-specific power limitation associated with the UE 505. For example, in addition to beam-specific power limitations indicated by the base station 510 (e.g., a beam-specific Pcmax value, beam-specific maximum power reduction (MPR) value, and/or the like), the UE 505 may have constraints on the maximum transmit power in one or more beam directions. For example, one such constraint includes a maximum permissible exposure (MPE) constraint to prevent too much radiation exposure to the human body. In some aspects, the UE 505 may signal such UE-side beam-specific power limitation to the base station 510, and the base station 510 may reconfigure one or more beam-specific power parameters (e.g., Pcmax and/or the like) for the affected beam(s). The base station 510 may indicate the reconfigured beam-specific power parameter(s) to the UE 505, and the UE 505 may use these parameter(s) to determine the power headroom value for the affected beams. Additionally, or alternatively, the UE 505 may autonomously reduce the maximum transmit power (Pcmax) based at least in part on the UE-side beam-specific power limitation, thereby reporting a lower power headroom value. In this case, the maximum transmit power (Pcmax) for a beam may depend on a beam-specific Pcmax value, a beam-specific MPR value, and/or a beam-specific offset due to the UE-side beam-specific power limitation (e.g., an MPE constraint and/or the like).

In some aspects, the UE 505 may report (e.g., using a PHR) a power headroom value, the reduced maximum transmit power, the maximum transmit power before reduction, and/or the beam-specific offset to the base station 510. Additionally, or alternatively, the UE 505 may report (e.g., using a PHR), a plurality of reports (e.g., a plurality of PHRs) corresponding to a plurality of beams (e.g., one or more beams other than the beam used in a slot that includes a report). In some aspects, the plurality of beams may be identified in the plurality of reports using a plurality of beam identifiers. Additionally, or alternatively, the plurality of beams may be identified implicitly, such as by an order of the reports that corresponds to the beams. For example, a first report may correspond to a first beam (e.g., a control beam), a second report may correspond to a second beam (e.g., a data beam), and/or the like. Such ordering may be indicated in, for example, an RRC message, a MAC control element, DCI, and/or the like.

In some aspects, transmission of a PHR may be triggered based at least in part on a change in a UE-side beam-specific power limitation satisfying a threshold. In this way, the UE 505 may notify the base station 510 regarding power constraints on the UE 505, and may modify scheduling and/or beam management accordingly. The threshold itself may be beam-specific and may be configured by RRC, MAC-CE or DCI, for example, when the beam is configured.

The above methods regarding reporting one or more beam-specific PHRs possibly based on beam-specific pathloss triggers can also be extended to waveform-specific PHR reporting, or to any combination of waveform-specific, channel-specific, and/or beam-specific PHR reporting. Some or all of the parameters governing the PHR calculation, including network-configured Pcmax, the MPR, the UE-determined Pcmax which is related to Pcmax and MPR, and/or transmit power for transmitted signals, could be dependent on the waveform to be used for the transmitted signal, for example, whether the waveform is CP-OFDM or DFT-s-OFDM.

When reporting PHR for slots in which there is no transmitted signal, a nominal transmission waveform (for example, DFT-s-OFDM) could be used. Additionally, or alternatively, multiple PHRs could be reported, one for each possible waveform type. The waveform type for each PHR could be explicitly indicated as part of the PHR or implicitly determined by the ordering of the PHRs. Further, the PHR reporting itself could be triggered based at least in part on the waveform type. For example, a new PUSCH packet may include PHR under certain combinations of the waveform to be used for this packet and the waveform that was used for the previous uplink transmission, or for the previous uplink PUSCH transmission. For example, PHR may be reported aperiodically whenever the PUSCH waveform changes, or only when it changes from DFT-s-OFDM to CP-OFDM. If the waveform changes during a HARQ re-transmission of PUSCH, this may constitute a trigger to transmit PHR aperiodically on the following new PUSCH packet, or with the next PUCCH transmission, or with whichever of these comes earlier.

Additionally, or alternatively, PHR transmission may be triggered aperiodically by padding conditions. For example, if the UE 505 received a large PUSCH grant but did not have sufficient data to send on the PUSCH grant, the UE 505 may fill up the packet with PHR reports for multiple slots, beams, waveforms, PHR-report types, channel types, or any combination thereof. Additionally, or alternatively, PHR transmission may be dynamically triggered by the base station 510 using an aperiodic indication. For example, the trigger could be in DCI scheduling for an uplink data channel (e.g., PUSCH), in DCI scheduling a downlink data channel (e.g., PDSCH) and a corresponding ACK on an uplink control channel (e.g., PUCCH), in the MAC-CE of the scheduled downlink data channel (e.g., PDSCH), and/or the like.

In some aspects, transmission of the PHR may be periodic. Additionally, or alternatively, transmission of the PHR may be triggered aperiodically. For example, transmission of the power headroom report may be triggered based at least in part on a change in path loss, detected by the UE 505, satisfying a threshold. In some aspects, the change in path loss may be beam-specific. In this case, the threshold may be beam-specific. Additionally, or alternatively, transmission of the PHR may be triggered for a specific beam. Additionally, or alternatively, a nominal signal configuration and/or a reference beam to be used to determine the power headroom value may be determined based at least in part on the beam that activated the path loss-based trigger. In this way, PHRs may be triggered for specific beams based on network conditions, thereby improving performance when network conditions are poor.

As indicated above, FIG. 5 is provided merely as an example. Other examples are possible and may differ from what was described with regard to FIG. 5.

Figure 6:
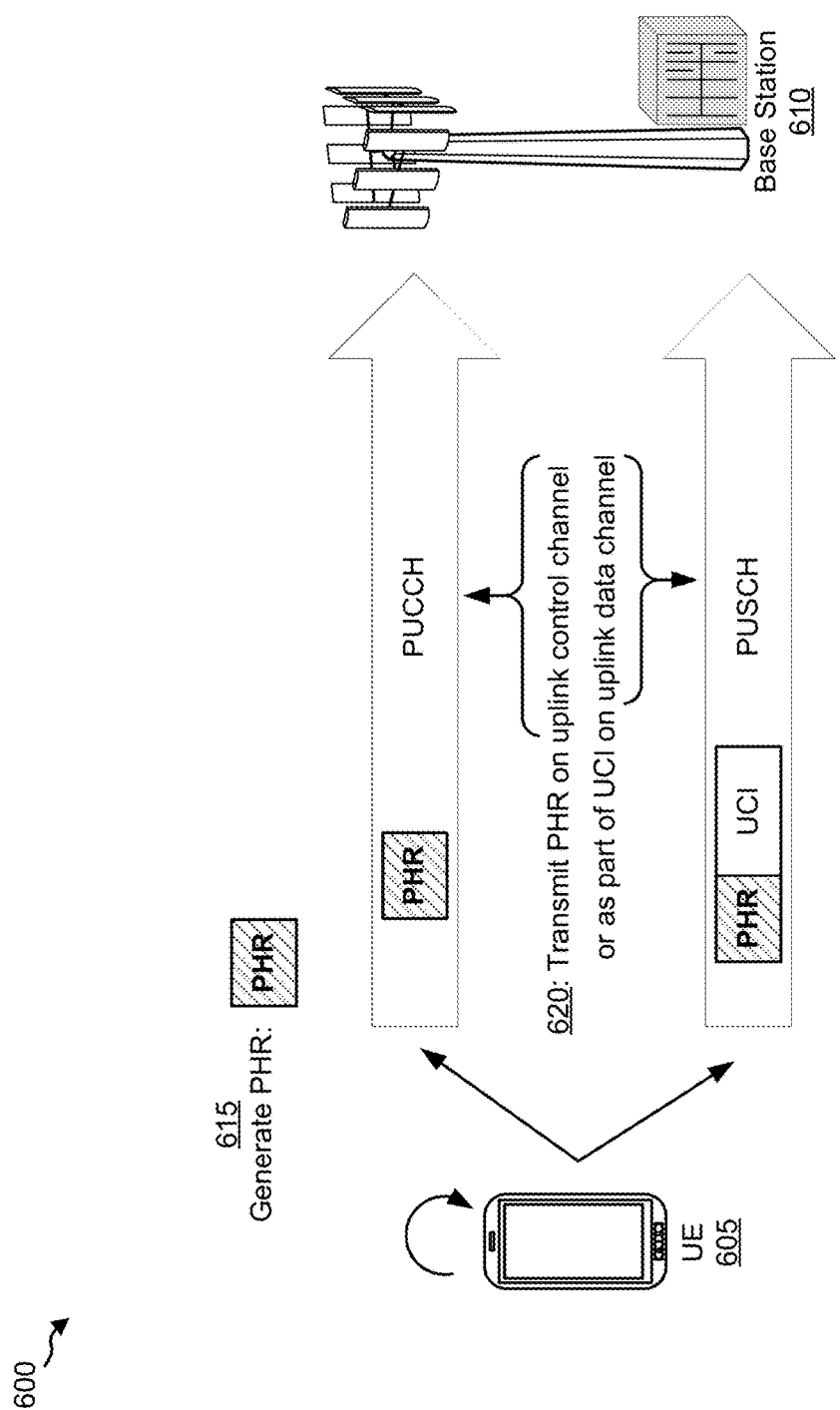
FIG. 6 is a diagram illustrating another example of power headroom reporting in New Radio, in accordance with various aspects of the present disclosure.

FIG. 6 is a diagram illustrating another example 600 of power headroom reporting in New Radio, in accordance with various aspects of the present disclosure.

As shown in FIG. 6, a UE 605 may communicate with a base station 610 to perform power headroom reporting. In some aspects, the UE 605 may correspond to one or more UEs described elsewhere herein, such as UE 120 of FIG. 1, UE 505 of FIG. 5, and/or the like. Additionally, or alternatively, the base station 610 may correspond to one or more base stations described elsewhere herein, such as base station 110 of FIG. 1, base station 510 of FIG. 5, and/or the like.

As shown by reference number 615, the UE 605 may generate a power headroom report (PHR), as described in more detail above in connection with FIG. 5. For example, the UE 605 may determine one or more signals, of a plurality of signals, to be transmitted in an uplink transmission, and may determine a maximum transmit power based at least in part on the one or more signals. Different signals of the plurality of signals may correspond to different maximum transmit powers. The UE 605 may generate the PHR based at least in part on the maximum transmit power, as described above in connection with FIG. 5.

As shown by reference number 620, the UE 605 may transmit the PHR on an uplink control channel or as part of uplink control information (UCI) transmitted on an uplink data channel. In some aspects, the uplink control channel may be a PUCCH, as shown. Additionally, or alternatively, the uplink data channel may be a PUSCH, as shown. In some aspects, the UE 605 may transmit the PHR on the uplink control channel. In some aspects, the UE 605 may transmit the PHR on the uplink data channel, as part of the UCI, without uplink data (e.g., as a UCI-only transmission on the PUSCH). In some aspects, the UE 605 may transmit the PHR on the uplink data channel, as part of the UCI, with uplink data (e.g., as UCI on the PUSCH along with PUSCH data).

Additionally, or alternatively, the UE 605 may transmit the PHR as part of a MAC header that is included with a null data packet and transmitted on the uplink data channel. For example, in LTE, if there is a PUSCH payload, then the PHR may be transmitted as part of the MAC header of that PUSCH payload. In NR, the UE 605 may transmit an empty PUSCH payload (e.g., a null data packet) with a MAC header used to carry the PHR.

In some aspects, the UE 605 may determine whether to transmit the power headroom report on the uplink control channel. For example, in some aspects, the UE 605 may make this determination based at least in part on a format of the uplink control channel. Additionally, or alternatively, the UE 605 may make this determination based at least in part on a payload size of an uplink transmission used to generate the power headroom report. Additionally, or alternatively, the UE 605 may make this determination based at least in part on a resource block allocation for the uplink transmission. Additionally, or alternatively, the UE 605 may make this determination based at least in part on one or more types of UCI being carried on the uplink control channel. In this way, the UE 605 may transmit the PHR on the uplink control channel when conditions are favorable for such a transmission (e.g., uplink control channel traffic is low, there are sufficient RBs to carry the PHR, and/or the like).

As indicated above, FIG. 6 is provided merely as an example. Other examples are possible and may differ from what was described with regard to FIG. 6.

Figure 7:
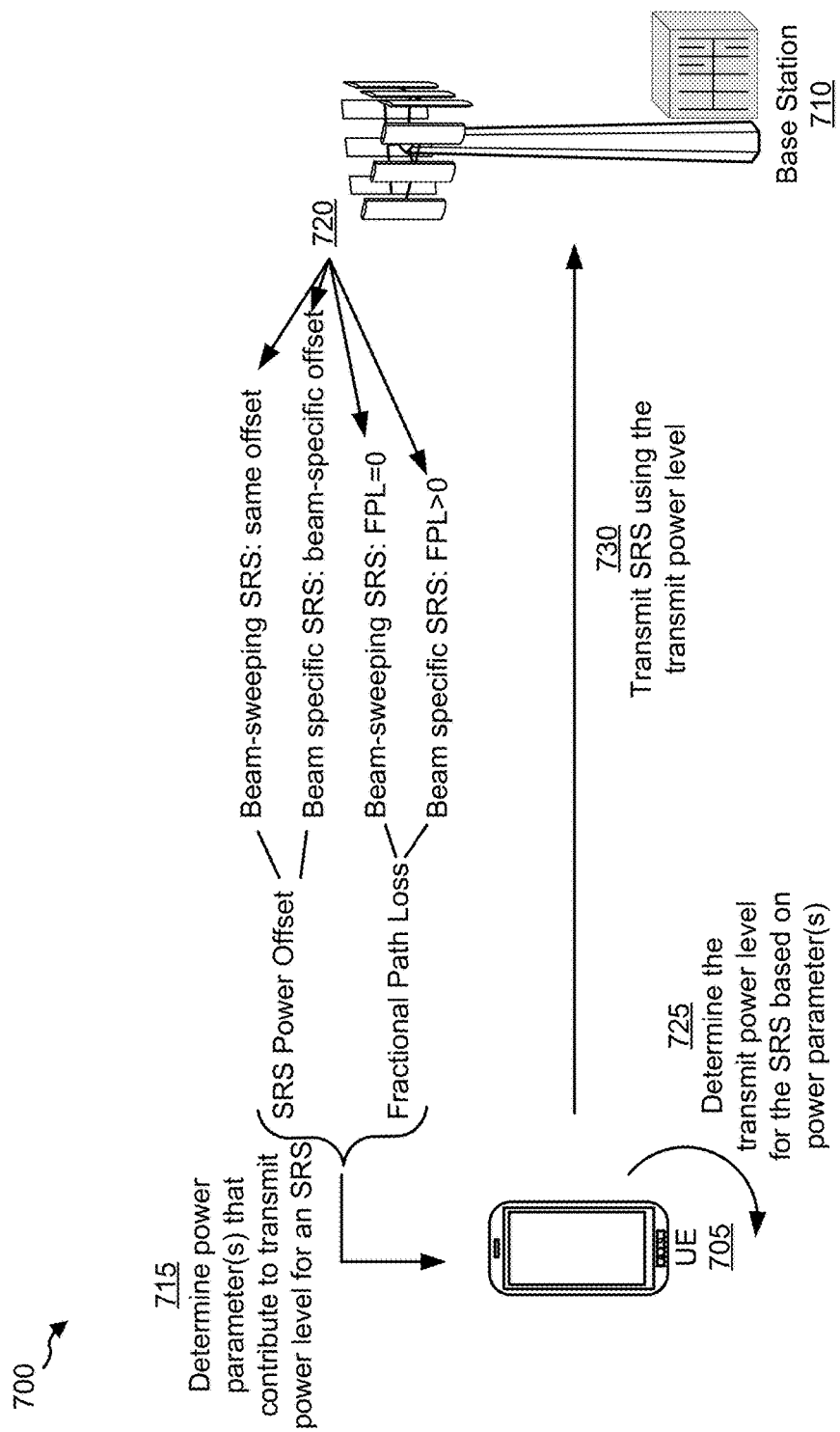
FIG. 7 is a diagram illustrating an example of sounding reference signal (SRS) power control in New Radio, in accordance with various aspects of the present disclosure.

FIG. 7 is a diagram illustrating an example 700 of sounding reference signal (SRS) power control in New Radio, in accordance with various aspects of the present disclosure.

As shown in FIG. 7, a UE 705 may communicate with a base station 710 to perform SRS communication. In some aspects, the UE 705 may correspond to one or more UEs described elsewhere herein, such as UE 120 of FIG. 1, UE 505 of FIG. 5, UE 605 of FIG. 6, and/or the like. Additionally, or alternatively, the base station 710 may correspond to one or more base stations described elsewhere herein, such as base station 110 of FIG. 1, base station 510 of FIG. 5, base station 610 of FIG. 6, and/or the like.

As shown by reference number 715, the UE 705 may determine one or more power parameters that contribute to a transmit power level for an SRS. In some aspects, the one or more power parameters may include a beam-specific SRS parameter. Additionally, or alternatively, the one or more power parameters may include an SRS power offset value. In some aspects, the SRS power offset value may be beam-specific. Additionally, or alternatively, the one or more power parameters may include a fractional path loss value for the SRS. In some aspects, the fractional path loss value for the SRS may be different from a fractional path loss value associated with an uplink data channel.

As shown by reference number 720, the one or more power parameters may be configured differently for different types of SRS transmissions. An SRS transmission type may include, for example, a beam-sweeping SRS transmission, a beam-specific SRS transmission, and/or the like. A beam-sweeping SRS transmission may refer to an SRS transmission that is transmitted on multiple (e.g., all) beams, such as by using a beam sweeping pattern. A beam-specific SRS transmission may refer to an SRS transmission that is transmitted on a particular beam. In some aspects, the UE 705 may determine a type of SRS transmission, and may determine the one or more power parameters based at least in part on the type of SRS transmission.

As further shown by reference number 720, in some aspects, if the SRS transmission is a beam-sweeping SRS, then the UE 705 may use a same SRS power offset value for all beams via which the beam-sweeping SRS is to be transmitted. In this way, UE-side beam-specific power limitations (e.g., MPE constraints) may be accurately reflected in the beam SINR as received by the base station 710. Additionally, or alternatively, if the SRS transmission is a beam-sweeping SRS, then the UE 705 may set a fractional path loss value to zero for the beam-sweeping SRS. This is because downlink path loss may not accurately reflect the uplink channel condition when uplink beam-sweeping is used in a non-reciprocal scenario.

As further shown by reference number 720, in some aspects, if the SRS transmission is a beam-specific SRS, then the UE 705 may use a beam-specific SRS power offset value for a beam via which the beam-specific SRS is to be transmitted. In this way, the SINR of the beam may be more accurately reflected. Additionally, or alternatively, if the SRS transmission is a beam-specific SRS, then the UE 705 may set a fractional path loss value to a value greater than zero for the beam-specific SRS. In this case, there may be beam-specific reciprocity between the uplink and downlink channels, which may be taken into account using a fractional path loss value greater than zero.

As shown by reference number 725, the UE 705 may determine the transmit power level for the SRS based at least in part on the one or more power parameters. For example, the UE 705 may determine the transmit power level as a minimum of the maximum transmit power for the UE 705 (e.g., Pcmax), which may correspond to the SRS (as described elsewhere herein in connection with FIG. 5), and a sum of one or more of the fractional path loss value, the SRS power offset value, a bandwidth value (e.g., based at least in part on the number of resource blocks used for the SRS), accumulated transmit power control commands, a SINR target value, and/or the like.

As shown by reference number 730, the UE 705 may transmit the SRS using the transmit power level. In some aspects, if the SRS is a beam-specific SRS, then the UE 705 may transmit the SRS on the specified beam. In some aspects, if the SRS is a beam-sweeping SRS, then the UE 705 may transmit the SRS on multiple beams using a beam sweeping pattern. The UE 705 may transmit the SRS using the transmit power determined as described above. In this way, beam-specific and/or signal-specific power control may be used for the SRS to account for transmissions of specific types of signals using specific beams.

As indicated above, FIG. 7 is provided merely as an example. Other examples are possible and may differ from what was described with regard to FIG. 7.

Figure 8:
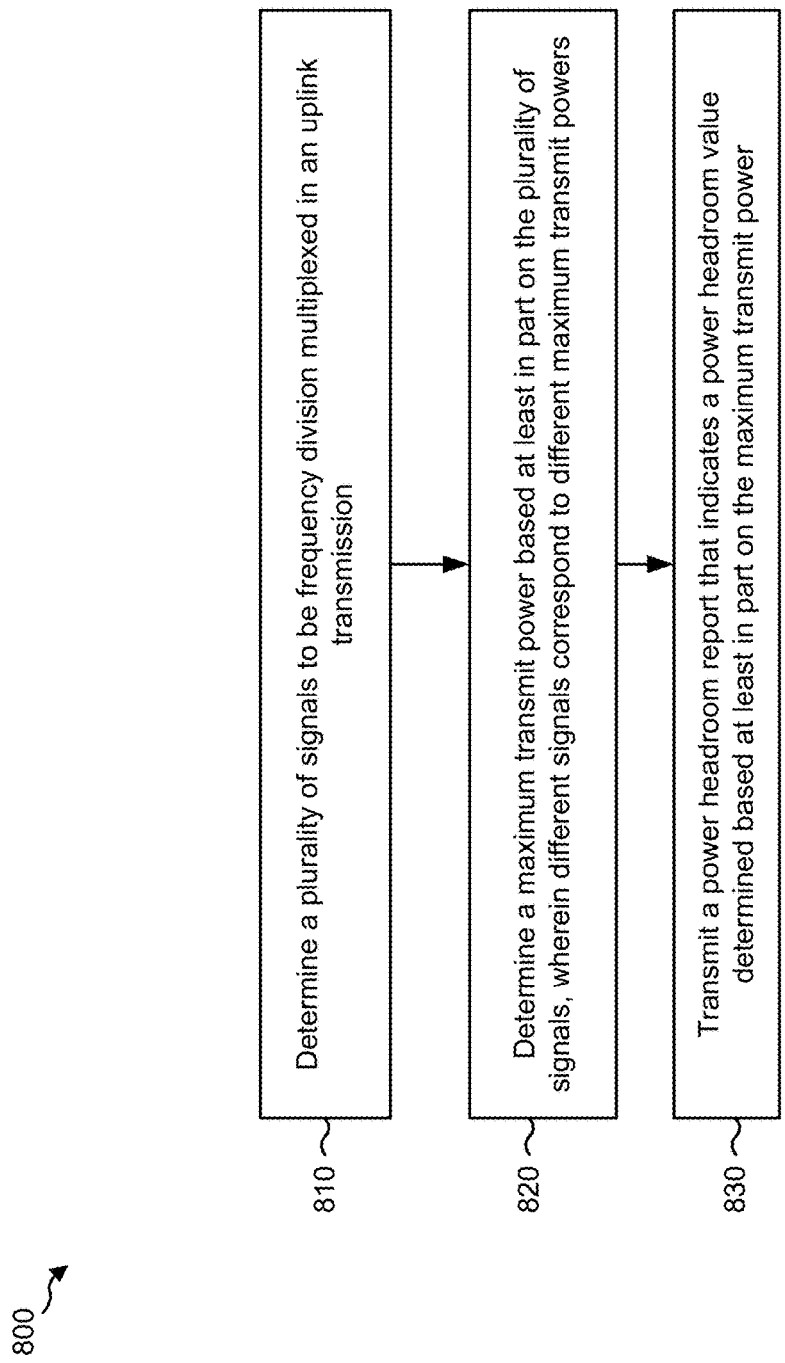

FIG. 8 is a diagram illustrating an example process 800 performed, for example, by a UE, in accordance with various aspects of the present disclosure. Example process 800 is an example where a UE (e.g., UE 120, UE 505, UE 605, UE 705, and/or the like) performs power headroom reporting.

As shown in FIG. 8, in some aspects, process 800 may include determining a plurality of signals to be frequency division multiplexed in an uplink transmission (block 810). For example, the UE (e.g., using controller/processor 280 and/or the like) may determine a plurality of signals to be frequency division multiplexed in an uplink transmission, as described elsewhere herein in connection with FIGS. 5 and 6.

As further shown in FIG. 8, in some aspects, process 800 may include determining a maximum transmit power based at least in part on the plurality of signals, wherein different signals correspond to different maximum transmit powers (block 820). For example, the UE (e.g., using controller/processor 280 and/or the like) may determine a maximum transmit power based at least in part on the plurality of signals, as described elsewhere herein in connection with FIGS. 5 and 6. In some aspects, different signals may correspond to different maximum transmit powers.

As further shown in FIG. 8, in some aspects, process 800 may include transmitting a power headroom report that indicates a power headroom value determined based at least in part on the maximum transmit power (block 830). For example, the UE (e.g., using controller/processor 280, transmit processor 264, TX MIMO processor 266, MOD 254, antenna 252, and/or the like) may transmit a power headroom report that indicates a power headroom value determined based at least in part on the maximum transmit power, as described elsewhere herein in connection with FIGS. 5 and 6.

Process 800 may include additional aspects, such as any single aspect or any combination of aspects described below and/or in connection with one or more other processes described elsewhere herein.

In some aspects, the plurality of signals includes at least three signals. In some aspects, the maximum transmit power is determined based at least in part on a beam via which the uplink transmission is to be transmitted. In some aspects, the plurality of signals includes a signal on an uplink control channel, and the maximum transmit power corresponds to the uplink control channel. In some aspects, the maximum transmit power is determined based at least in part on an indication, associated with the plurality of signals, indicated in a radio resource control message.

In some aspects, the maximum transmit power is determined based at least in part on: a maximum transmit power corresponding to a signal of the plurality of signals, an average of a plurality of maximum transmit powers corresponding to the plurality of signals, a maximum of the plurality of maximum transmit powers, or some combination thereof. In some aspects, the maximum transmit power is determined based at least in part on: whether the plurality of signals are frequency division multiplexed across an entire transmission time of the uplink transmission or a partial transmission time of the uplink transmission, whether the plurality of signals are transmitted on a same beam or different beams, or some combination thereof.

In some aspects, the power headroom report is transmitted on an uplink control channel or is transmitted as part of uplink control information that is included on an uplink data channel with or without inclusion of uplink data. In some aspects, the power headroom report is transmitted on an uplink control channel based at least in part on a determination that: the uplink control channel is a particular format, a payload size of the uplink transmission satisfies a condition, a resource block allocation for the uplink transmission satisfies a condition, uplink control information, being carried on the uplink control channel, is of a particular type, or some combination thereof.

In some aspects, the power headroom value is determined based at least in part on a nominal signal configuration of a plurality of nominal signal configurations corresponding to the plurality of signals. In some aspects, different combinations of signals correspond to different nominal signal configurations. In some aspects, the power headroom value is determined based at least in part on a reference beam. In some aspects, the reference beam is determined as a function of time. In some aspects, the nominal signal configuration or the reference beam is determined based at least in part on a configuration received in one or more of: a radio resource control message, a media access control (MAC) control element, downlink control information, or some combination thereof.

In some aspects, transmission of the power headroom report is triggered based at least in part on a change in path loss satisfying a threshold determined based at least in part on a beam for the uplink transmission. In some aspects, transmission of the power headroom report is triggered for a specific beam.

In some aspects, the power headroom value is determined based at least in part on a number of repetitions associated with the uplink transmission. In some aspects, the power headroom value is determined based at least in part on a UE-side beam-specific power limitation. In some aspects, transmission of the power headroom report is triggered based at least in part on a change in a UE-side beam-specific power limitation satisfying a threshold. In some aspects, the power headroom report includes a plurality of reports corresponding to a plurality of beams. In some aspects, the plurality of beams are identified in the plurality of reports using a plurality of beam identifiers. In some aspects, the plurality of signals include one or more of: an uplink control channel signal, an uplink data channel signal, a sounding reference signal, or some combination thereof.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
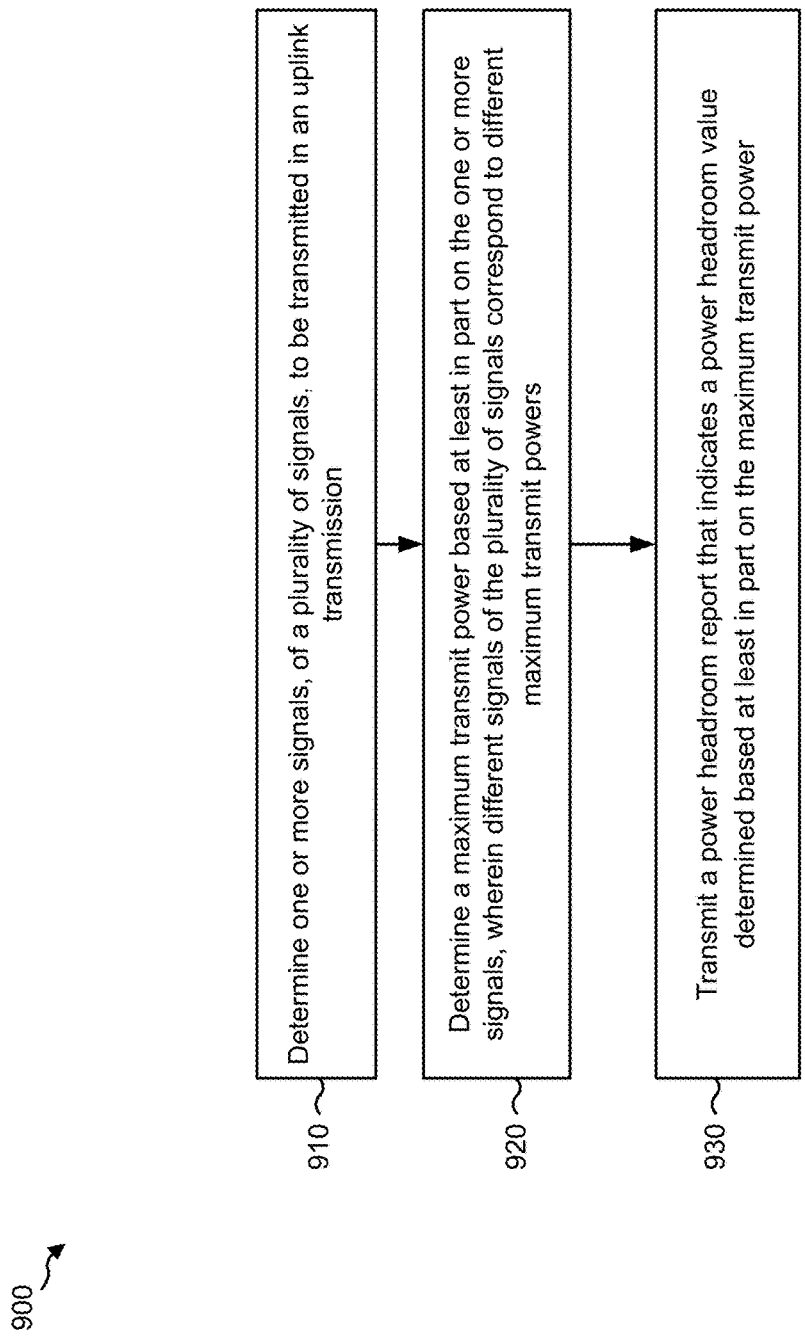

FIG. 9 is a diagram illustrating an example process 900 performed, for example, by a UE, in accordance with various aspects of the present disclosure. Example process 900 is an example where a UE (e.g., UE 120, UE 505, UE 605, UE 705, and/or the like) performs power headroom reporting.

As shown in FIG. 9, in some aspects, process 900 may include determining one or more signals, of a plurality of signals, to be transmitted in an uplink transmission (block 910). For example, the UE (e.g., using controller/processor 280 and/or the like) may determine one or more signals, of a plurality of signals, to be transmitted in an uplink transmission, as described elsewhere herein in connection with FIGS. 5 and 6.

As further shown in FIG. 9, in some aspects, process 900 may include determining a maximum transmit power based at least in part on the one or more signals, wherein different signals of the plurality of signals correspond to different maximum transmit powers (block 920). For example, the UE (e.g., using controller/processor 280 and/or the like) may determine a maximum transmit power based at least in part on the one or more signals, as described elsewhere herein in connection with FIGS. 5 and 6. In some aspects, different signals of the plurality of signals may correspond to different maximum transmit powers.

As further shown in FIG. 9, in some aspects, process 900 may include transmitting a power headroom report that indicates a power headroom value determined based at least in part on the maximum transmit power (block 930). For example, the UE (e.g., using controller/processor 280, transmit processor 264, TX MIMO processor 266, MOD 254, antenna 252, and/or the like) may transmit a power headroom report that indicates a power headroom value determined based at least in part on the maximum transmit power, as described elsewhere herein in connection with FIGS. 5 and 6.

Process 900 may include additional aspects, such as any single aspect or any combination of aspects described below and/or in connection with one or more other processes described elsewhere herein.

In some aspects, the one or more signals includes at least two signals, of the plurality of signals, that are frequency division multiplexed in the uplink transmission. In some aspects, the one or more signals includes at least three signals. In some aspects, the maximum transmit power is determined based at least in part on a beam via which the uplink transmission is to be transmitted. In some aspects, the one or more signals includes a signal on an uplink control channel, and the maximum transmit power corresponds to the uplink control channel. In some aspects, the maximum transmit power is determined based at least in part on an indication, associated with the one or more signals, indicated in a radio resource control message.

In some aspects, the maximum transmit power is determined based at least in part on: a maximum transmit power corresponding to a signal of the one or more signals, an average of a plurality of maximum transmit powers corresponding to the plurality of signals, a maximum of the plurality of maximum transmit powers, or some combination thereof. In some aspects, the maximum transmit power is determined based at least in part on: whether the plurality of signals are frequency division multiplexed across an entire transmission time of the uplink transmission or a partial transmission time of the uplink transmission, whether the plurality of signals are transmitted on a same beam or different beams, or some combination thereof.

In some aspects, the power headroom report is transmitted on an uplink control channel or is transmitted as part of uplink control information that is included on an uplink data channel with or without inclusion of uplink data. In some aspects, the power headroom report is transmitted on an uplink control channel based at least in part on a determination that: the uplink control channel is a particular format, a payload size of the uplink transmission satisfies a condition, a resource block allocation for the uplink transmission satisfies a condition, uplink control information, being carried on the uplink control channel, is of a particular type, or some combination thereof.

In some aspects, the power headroom value is determined based at least in part on a nominal signal configuration of one or more nominal signal configurations corresponding to the one or more signals. In some aspects, different combinations of signals correspond to different nominal signal configurations. In some aspects, the power headroom value is determined based at least in part on a reference beam. In some aspects, the reference beam is determined as a function of time. In some aspects, the nominal signal configuration or the reference beam is determined based at least in part on a configuration received in one or more of: a radio resource control message, a media access control (MAC) control element, downlink control information, or some combination thereof.

In some aspects, transmission of the power headroom report is triggered based at least in part on a change in path loss satisfying a threshold determined based at least in part on a beam for the uplink transmission. In some aspects, transmission of the power headroom report is triggered for a specific beam.

In some aspects, the power headroom value is determined based at least in part on a number of repetitions associated with the uplink transmission. In some aspects, the power headroom value is determined based at least in part on a UE-side beam-specific power limitation. In some aspects, transmission of the power headroom report is triggered based at least in part on a change in a UE-side beam-specific power limitation satisfying a threshold. In some aspects, the power headroom report includes a plurality of reports corresponding to a plurality of beams. In some aspects, the plurality of beams are identified in the plurality of reports using a plurality of beam identifiers. In some aspects, the one or more signals include one or more of: an uplink control channel signal, an uplink data channel signal, a sounding reference signal, or some combination thereof.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
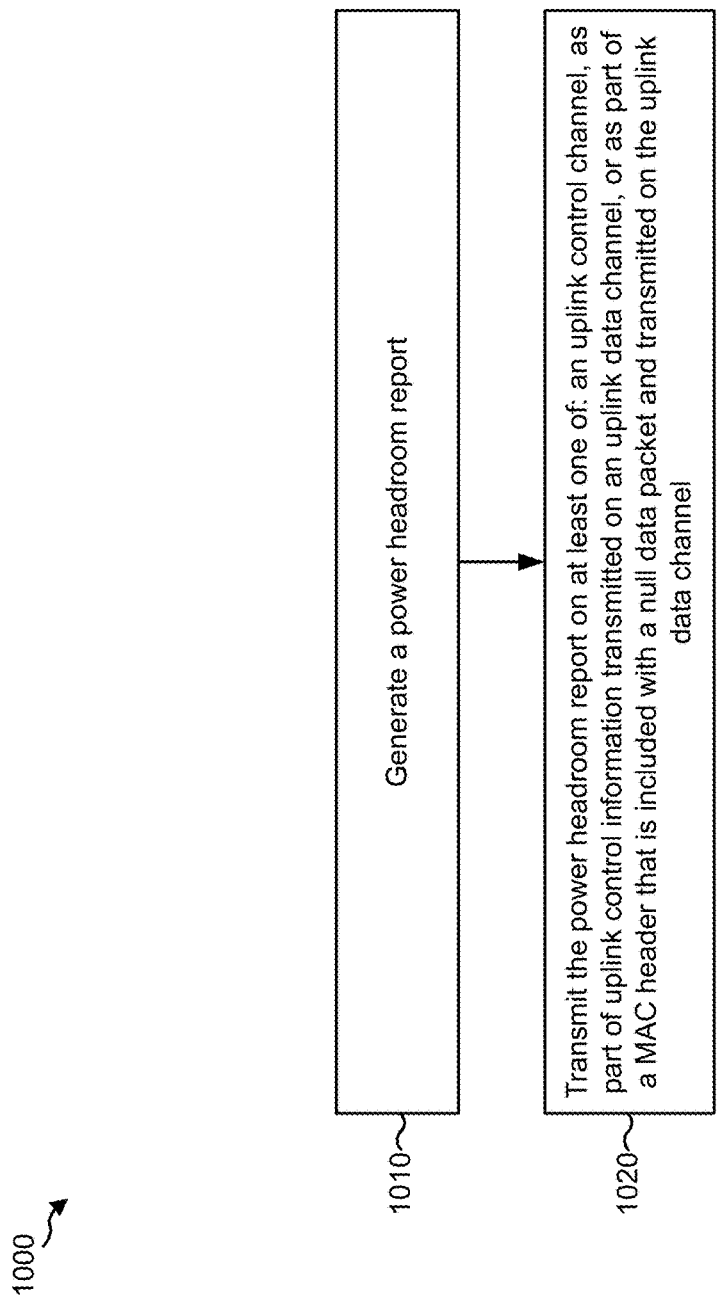

FIG. 10 is a diagram illustrating an example process 1000 performed, for example, by a UE, in accordance with various aspects of the present disclosure. Example process 1000 is an example where a UE (e.g., UE 120, UE 505, UE 605, UE 705, and/or the like) performs power headroom reporting.

As shown in FIG. 10, in some aspects, process 1000 may include generating a power headroom report (block 1010). For example, the UE (e.g., using controller/processor 280 and/or the like) may generate a power headroom report, as described elsewhere herein in connection with FIGS. 5 and 6.

As further shown in FIG. 10, in some aspects, process 1000 may include transmitting the power headroom report on at least one of: an uplink control channel, as part of uplink control information transmitted on an uplink data channel, or as part of a MAC header that is included with a null data packet and transmitted on the uplink data channel (block 1020). For example, the UE (e.g., using controller/processor 280, transmit processor 264, TX MIMO processor 266, MOD 254, antenna 252, and/or the like) may transmit the power headroom report on an uplink control channel or as part of uplink control information transmitted on an uplink data channel, as described elsewhere herein in connection with FIGS. 5 and 6.

Process 1000 may include additional aspects, such as any single aspect or any combination of aspects described below and/or in connection with one or more other processes described elsewhere herein.

In some aspects, the UE may determine whether to transmit the power headroom report on the uplink control channel based at least in part on: a format of the uplink control channel, a payload size of an uplink transmission used to generate the power headroom report, a resource block allocation for the uplink transmission, one or more types of uplink control information being carried on the uplink control channel, or some combination thereof.

In some aspects, the power headroom report is transmitted on the uplink control channel. In some aspects, the power headroom report is transmitted on the uplink data channel, as part of the uplink control information, with uplink data. In some aspects, the power headroom report is transmitted on the uplink data channel, as part of the uplink control information, without uplink data. In some aspects, the power headroom report is transmitted as part of the MAC header that is included with the null data packet and transmitted on the uplink data channel In some aspects, the UE may determine one or more signals, of a plurality of signals, to be transmitted in an uplink transmission; may determine a maximum transmit power based at least in part on the one or more signals, wherein different signals of the plurality of signals correspond to different maximum transmit powers; and may generate the power headroom report based at least in part on the maximum transmit power.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
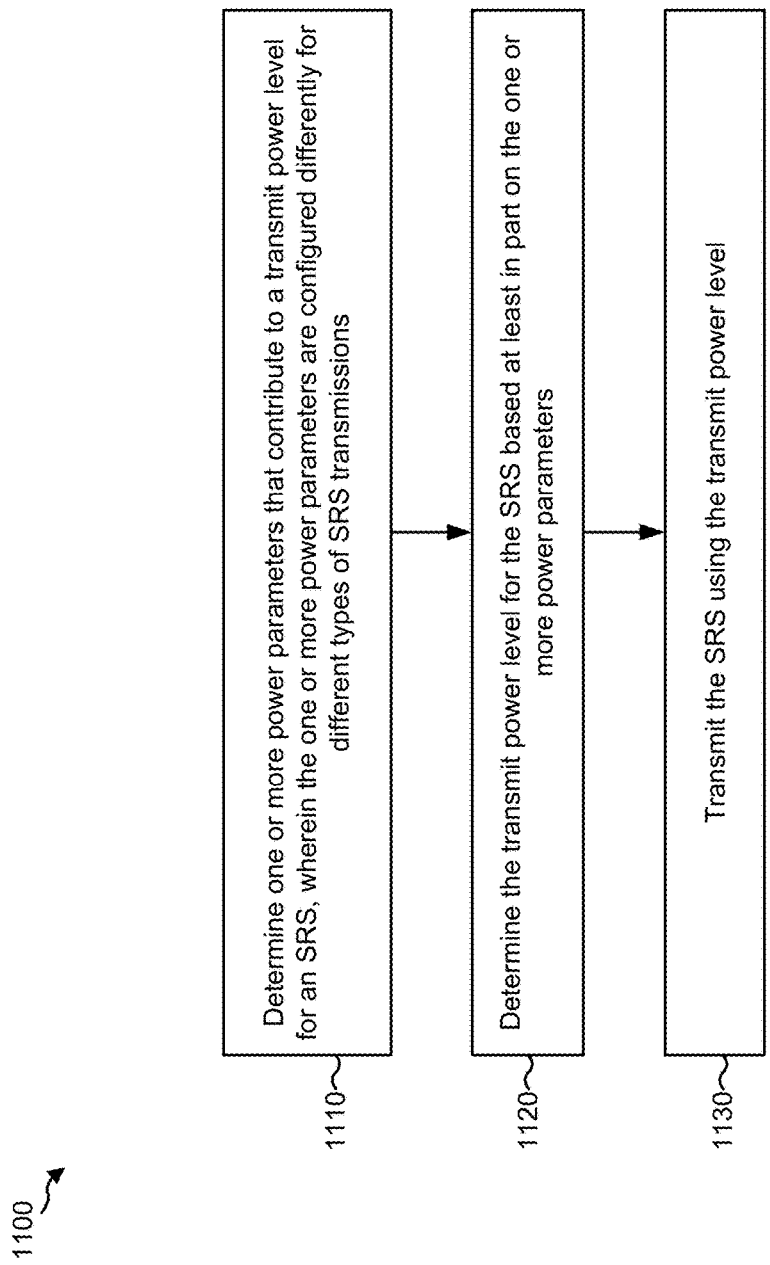

FIG. 11 is a diagram illustrating an example process 1100 performed, for example, by a UE, in accordance with various aspects of the present disclosure. Example process 1100 is an example where a UE (e.g., UE 120, UE 505, UE 605, UE 705, and/or the like) performs SRS power control.

As shown in FIG. 11, in some aspects, process 1100 may include determining one or more power parameters that contribute to a transmit power level for an SRS, wherein the one or more power parameters are configured differently for different types of SRS transmissions (block 1110). For example, the UE (e.g., using controller/processor 280 and/or the like) may determine one or more power parameters that contribute to a transmit power level for an SRS, as described elsewhere herein in connection with FIG. 7. In some aspects, the one or more power parameters are configured differently for different types of SRS transmissions.

As further shown in FIG. 11, in some aspects, process 1100 may include determining the transmit power level for the SRS based at least in part on the one or more power parameters (block 1120). For example, the UE (e.g., using controller/processor 280 and/or the like) may determine the transmit power level for the SRS based at least in part on the one or more power parameters, as described elsewhere herein in connection with FIG. 7.

As further shown in FIG. 11, in some aspects, process 1100 may include transmitting the SRS using the transmit power level (block 1130). For example, the UE (e.g., using controller/processor 280, transmit processor 264, TX MIMO processor 266, MOD 254, antenna 252, and/or the like) may transmit the SRS using the transmit power level, as described elsewhere herein in connection with FIG. 7.

Process 1100 may include additional aspects, such as any single aspect or any combination of aspects described below and/or in connection with one or more other processes described elsewhere herein.

In some aspects, the different types of SRS transmissions include at least one of: a beam-sweeping SRS transmission, a beam-specific SRS transmission, or some combination thereof. In some aspects, the one or more power parameters include a beam-specific SRS parameter. In some aspects, the beam-specific SRS parameter is a beam-specific SRS power offset value. In some aspects, the one or more power parameters includes a fractional path loss value for the SRS that is different from a fractional path loss value associated with an uplink data channel.

In some aspects, the UE may determine that the SRS is a beam-sweeping SRS, and may determine a same SRS power offset value for all beams via which the beam-sweeping SRS is to be transmitted. In some aspects, the UE may determine that the SRS is a beam-sweeping SRS, and may set a fractional path loss value to zero for the beam-sweeping SRS.

In some aspects, the UE may determine that the SRS is a beam-specific SRS, and may determine a beam-specific SRS power offset value for a beam via which the beam-specific SRS is to be transmitted. In some aspects, the UE may determine that the SRS is a beam-specific SRS, and may set a fractional path loss value to a value greater than zero for the beam-specific SRS.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
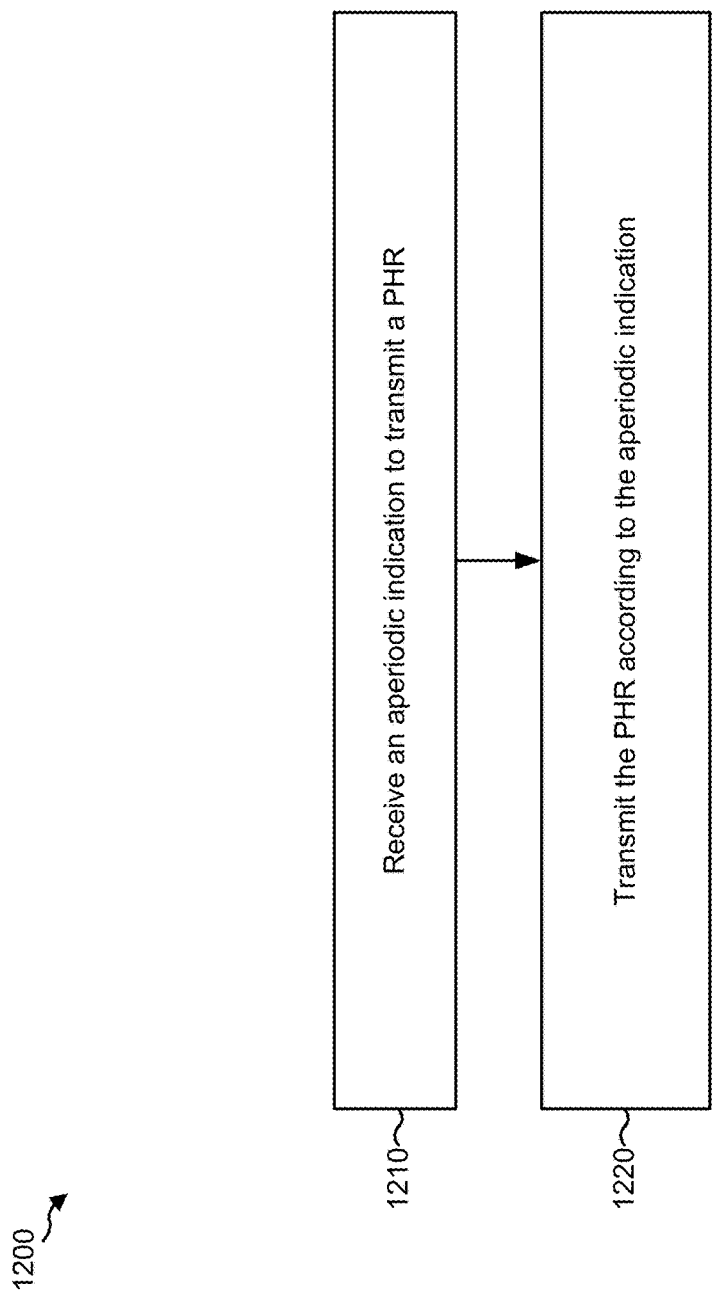

FIG. 12 is a diagram illustrating an example process 1200 performed, for example, by a UE, in accordance with various aspects of the present disclosure. Example process 1200 is an example where a UE (e.g., UE 120, UE 505, UE 605, UE 705, and/or the like) performs power headroom reporting.

As shown in FIG. 12, in some aspects, process 1200 may include receiving an aperiodic indication to transmit a PHR (block 1210). For example, the UE (e.g., using antenna 252, DEMOD 254, MIMO detector 256, receive processor 258, controller/processor 280, and/or the like) may receive an aperiodic indication to transmit a PHR, as described elsewhere herein in connection with FIGS. 5 and 6.

As further shown in FIG. 12, in some aspects, process 1200 may include transmitting the PHR according to the aperiodic indication (block 1220). For example, the UE (e.g., using controller/processor 280, transmit processor 264, TX MIMO processor 266, MOD 254, antenna 252, and/or the like) may transmit the PHR according to the aperiodic indication, as described elsewhere herein in connection with FIGS. 5 and 6.

Process 1200 may include additional aspects, such as any single aspect or any combination of aspects described below and/or in connection with one or more other processes described elsewhere herein.

In some aspects, the aperiodic indication is received in at least one of: downlink control information scheduling a downlink packet or an uplink packet, or a media access control header associated with a downlink packet. In some aspects, the aperiodic indication includes a configuration for a transmission of the PHR together with an uplink data communication or an uplink control communication based on at least one of: a waveform to be used for the transmission, or a waveform that was used for a previous transmission.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a UE, in accordance with various aspects of the present disclosure. Example process 1300 is an example where a UE (e.g., UE 120, UE 505, UE 605, UE 705, and/or the like) performs beam-specific power control.

As shown in FIG. 13, in some aspects, process 1300 may include determining a signal to be transmitted via a beam (block 1310). For example, the UE (e.g., using controller/processor 280 and/or the like) may determine a signal to be transmitted via a beam, as described above in connection with FIGS. 5-7.

As further shown in FIG. 13, in some aspects, process 1300 may include determining a maximum transmit power for the beam based at least in part on the signal (block 1320). For example, the UE (e.g., using controller/processor 280 and/or the like) may determine a maximum transmit power for the beam based at least in part on the signal, as described above in connection with FIGS. 5-7.

As further shown in FIG. 13, in some aspects, process 1300 may include transmitting the signal via the beam based at least in part on the maximum transmit power (block 1330). For example, the UE (e.g., using controller/processor 280, transmit processor 264, TX MIMO processor 266, MOD 254, antenna 252, and/or the like) may transmit the signal via the beam based at least in part on the maximum transmit power, as described above in connection with FIGS. 5-7.

Process 1300 may include additional aspects, such as any single aspect or any combination of aspects described below and/or in connection with one or more other processes described elsewhere herein.

In some aspects, the signal includes at least one of an uplink control signal, an uplink data signal, or a sounding reference signal. In some aspects, the maximum transmit power for the beam is reported in a power headroom report. In some aspects, the power headroom report is triggered based at least in part on a beam-specific condition associated with the beam. In some aspects, the beam-specific condition includes a change in a UE-side beam-specific power limitation satisfying a threshold. In some aspects, the threshold is beam-specific for the beam.

In some aspects, the signal is a first signal, the beam is a first beam, and the maximum transmit power is a first maximum transmit power; and the first maximum transmit power is different from a second maximum transmit power determined for a second beam used to transmit a second signal different from the first signal. In some aspects, the first maximum transmit power for the first beam and the second maximum transmit power for the second beam are reported in a power headroom report.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining one or more power parameters that contribute to a transmit power level for a sounding reference signal (SRS), wherein the one or more power parameters are configured differently for different types of SRS transmissions, wherein the different types of SRS transmissions include a first type of SRS transmission and a second type of SRS transmission, and wherein a power parameter, of the one or more power parameters, is configured to be a first value for the first type of SRS transmission and is configured to be a second value for the second type of SRS transmission;
    determining the transmit power level for the SRS based at least in part on the one or more power parameters; and
    transmitting the SRS using the transmit power level.

2. The method of claim 1,
    wherein the first type of SRS transmission is a beam-sweeping SRS transmission, and
    wherein the second type of SRS transmission is a beam-specific SRS transmission.

3. The method of claim 1, wherein the power parameter is a beam-specific SRS parameter.

4. The method of claim 3, wherein the beam-specific SRS parameter is a beam-specific SRS power offset value.

5. The method of claim 1, wherein the one or more power parameters include a fractional path loss value for the SRS that is different from a fractional path loss value associated with an uplink data channel.

6. The method of claim 1, further comprising:
    determining that the SRS is a beam-sweeping SRS; and
    wherein determining the one or more power parameters comprises determining a same SRS power offset value for all beams via which the beam-sweeping SRS is to be transmitted.

7. The method of claim 1, further comprising:
    determining that the SRS is a beam-specific SRS; and
    wherein determining the one or more power parameters comprises determining a beam-specific SRS power offset value for a beam via which the beam-specific SRS is to be transmitted.

8. The method of claim 1, further comprising:
    determining that the SRS is a beam-specific SRS; and
    wherein determining the one or more power parameters comprises setting a fractional path loss value to a value greater than zero for the beam-specific SRS.

9. A user equipment (UE) for wireless communication, comprising:
    memory; and
    one or more processors operatively coupled to the memory, configured to:
        determine one or more power parameters that contribute to a transmit power level for a sounding reference signal (SRS), wherein the one or more power parameters are configured differently for different types of SRS transmissions, wherein the different types of SRS transmissions include a first type of SRS transmission and a second type of SRS transmission, wherein a power parameter, of the one or more power parameters, is configured to be a first value for the first type of SRS transmission and is configured to be a second value for the second type of SRS transmission;
        determine the transmit power level for the SRS based at least in part on the one or more power parameters; and
        transmit the SRS using the transmit power level.

10. The UE of claim 9,
    wherein the first type of SRS transmission is a beam-sweeping SRS transmission, and
    wherein the second type of SRS transmission is a beam-specific SRS transmission.

11. The UE of claim 9, wherein the power parameter is a beam-specific SRS parameter.

12. The UE of claim 11, wherein the beam-specific SRS parameter is a beam-specific SRS power offset value.

13. The UE of claim 9, wherein the one or more power parameters include a fractional path loss value for the SRS that is different from a fractional path loss value associated with an uplink data channel.

14. The UE of claim 9,
wherein the one or more processors are further configured to:
determine that the SRS is a beam-sweeping SRS; and
wherein, when determining the one or more power parameters, the one or more processors are configured to:
determine a same SRS power offset value for all beams via which the beam-sweeping SRS is to be transmitted.

15. The UE of claim 9,
wherein the one or more processors are further configured to:
determine that the SRS is a beam-specific SRS; and
wherein, when determining the one or more power parameters, the one or more processors are configured to:
determine a beam-specific SRS power offset value for a beam via which the beam-specific SRS is to be transmitted.

16. The UE of claim 9,
wherein the one or more processors are further configured to:
determine that the SRS is a beam-specific SRS; and
wherein, when determining the one or more power parameters, the one or more processors are configured to:
set a fractional path loss value to a value greater than zero for the beam-specific SRS.

17. A non-transitory computer-readable medium storing instructions for wireless communication, the instructions comprising:
one or more instructions that, when executed by one or more processors, cause the one or more processors to:
determine one or more power parameters that contribute to a transmit power level for a sounding reference signal (SRS), wherein the one or more power parameters are configured differently for different types of SRS transmissions, wherein the different types of SRS transmissions include a first type of SRS transmission and a second type of SRS transmission, wherein the one or more power parameters include a power parameter, and wherein the power parameter is configured to be a first value for the first type of SRS transmission and is configured to be a second value for the second type of SRS transmission;
determine the transmit power level for the SRS based at least in part on the one or more power parameters; and
transmit the SRS using the transmit power level.

18. The non-transitory computer-readable medium of claim 17,
wherein the first type of SRS transmission is a beam-sweeping SRS transmission, and
wherein the second type of SRS transmission is a beam-specific SRS transmission.

19. The non-transitory computer-readable medium of claim 17, wherein the power parameter is a beam-specific SRS parameter.

20. The non-transitory computer-readable medium of claim 19, wherein the beam-specific SRS parameter is a beam-specific SRS power offset value.

21. The non-transitory computer-readable medium of claim 17, wherein the one or more power parameters include a fractional path loss value for the SRS that is different from a fractional path loss value associated with an uplink data channel.

22. The non-transitory computer-readable medium of claim 17,
wherein the one or more instructions further cause the one or more processors to:
determine that the SRS is a beam-sweeping SRS; and
wherein the one or more instructions, that cause the one or more processors to determine the one or more power parameters, cause the one or more processors to:
determine a same SRS power offset value for all beams via which the beam-sweeping SRS is to be transmitted.

23. The non-transitory computer-readable medium of claim 17, wherein the one or more instructions further cause the one or more processors to:
determine that the SRS is a beam-specific SRS; and
wherein the one or more instructions, that cause the one or more processors to determine the one or more power parameters, cause the one or more processors to:
determine a beam-specific SRS power offset value for a beam via which the beam-specific SRS is to be transmitted.

24. The non-transitory computer-readable medium of claim 17, wherein the one or more instructions further cause the one or more processors to:
determine that the SRS is a beam-specific SRS; and
wherein the one or more instructions, that cause the one or more processors to determine the one or more power parameters, cause the one or more processors to:
determine a beam-specific SRS power offset value for a beam via which the beam-specific SRS is to be transmitted.

25. An apparatus for wireless communication, comprising:
means for determining one or more power parameters that contribute to a transmit power level for a sounding reference signal (SRS), wherein the one or more power parameters are configured differently for different types of SRS transmissions, wherein the different types of SRS transmissions include a first type of SRS transmission and a second type of SRS transmission, wherein the one or more power parameters include a power parameter, and wherein the power parameter is configured to be a first value for the first type of SRS transmission and is configured to be a second value for the second type of SRS transmission;
means for determining the transmit power level for the SRS based at least in part on the one or more power parameters; and
means for transmitting the SRS using the transmit power level.

26. The apparatus of claim 25,
wherein the first type of SRS transmission is a beam-sweeping SRS transmission, and
wherein the second type of SRS transmission is a beam-specific SRS transmission.

27. The apparatus of claim 25, wherein the power parameter is a beam-specific SRS parameter.

28. The apparatus of claim 27, wherein the beam-specific SRS parameter is a beam-specific SRS power offset value.

29. The apparatus of claim 25, wherein the one or more power parameters include a fractional path loss value for the SRS that is different from a fractional path loss value associated with an uplink data channel.

30. The apparatus of claim 25, further comprising:
means for determining that the SRS is a beam-sweeping SRS; and
wherein the means for determining the one or more power parameters comprises means for determining a same SRS power offset value for all beams via which the beam-sweeping SRS is to be transmitted.

31. The apparatus of claim 25, further comprising:
means for determining that the SRS is a beam-specific SRS; and
wherein the means for determining the one or more power parameters comprises means for determining a beam-specific SRS power offset value for a beam via which the beam-specific SRS is to be transmitted.

32. The apparatus of claim 25, further comprising:
means for determining that the first type of transmission is associated with the SRS; and
wherein the means for determining the one or more power parameters comprises means for determining the one or more parameters based on determining that the first type of transmission is associated with the SRS.

* * * * *